(12) United States Patent
Cullen et al.

(10) Patent No.: US 10,309,027 B2
(45) Date of Patent: Jun. 4, 2019

(54) METHOD FOR PRODUCING DISPERSIONS OF NANOSHEETS

(71) Applicant: UCL BUSINESS PCL, London (GB)

(72) Inventors: Patrick Linden Cullen, London (GB); Neal Skipper, London (GB); David Buckley, London (GB); Christopher Howard, London (GB)

(73) Assignee: UCL Business PLC, London, England (GB)

(*) Notice: Subject to any disclaimer, the term of this patent is extended or adjusted under 35 U.S.C. 154(b) by 147 days.

(21) Appl. No.: 15/118,665

(22) PCT Filed: Feb. 16, 2015

(86) PCT No.: PCT/GB2015/050433
§ 371 (c)(1),
(2) Date: Aug. 12, 2016

(87) PCT Pub. No.: WO2015/121682
PCT Pub. Date: Aug. 20, 2015

(65) Prior Publication Data
US 2017/0044683 A1    Feb. 16, 2017

(30) Foreign Application Priority Data

Feb. 17, 2014 (GB) .................................. 1402778.3
Dec. 23, 2014 (GB) .................................. 1423121.1

(51) Int. Cl.
*C25D 9/04* (2006.01)
*C01B 19/00* (2006.01)
(Continued)

(52) U.S. Cl.
CPC ............ *C25D 9/04* (2013.01); *B01J 13/0091* (2013.01); *C01B 19/007* (2013.01); *C01B 25/00* (2013.01);
(Continued)

(58) Field of Classification Search
None
See application file for complete search history.

(56) References Cited

U.S. PATENT DOCUMENTS

2003/0224168 A1   12/2003  Mack
2011/0045223 A1   2/2011   Lin
2014/0377159 A1*  12/2014  Howard ............... B01J 13/0043
                                                          423/448

FOREIGN PATENT DOCUMENTS

CN          102583547        7/2012
CN          102887490        1/2013
(Continued)

OTHER PUBLICATIONS

Bandaru et al., "Effect of Pressure and Temperature on Structural Stability of MoS$_2$," The Journal of Physical Chemistry, Feb. 2014.
(Continued)

*Primary Examiner* — Brian W Cohen
(74) *Attorney, Agent, or Firm* — BakerHostetler

(57) ABSTRACT

The present invention provides a method for producing a solution of nanosheets, comprising the step of contacting an intercalated layered material with a polar aprotic solvent to produce a solution of nanosheets, wherein the intercalated layered material is prepared from a layered material selected from the group consisting of a transition metal dichalcogenide, a transition metal monochalcogenide, a transition metal trichalcogenide, a transition metal oxide, a metal halide, an oxychalcogenide, an oxypnictide, an oxyhalide of a transition metal, a trioxide, a perovskite, a niobate, a ruthenate, a layered III-VI semiconductor, black phosphorous and a V-VI layered compound. The invention also provides a solution of nanosheets and a plated material formed from nanosheets.

24 Claims, 14 Drawing Sheets

(51) Int. Cl.
| | |
|---|---|
| C01G 19/00 | (2006.01) |
| C01G 21/00 | (2006.01) |
| C01G 23/00 | (2006.01) |
| C01G 25/00 | (2006.01) |
| C01G 31/00 | (2006.01) |
| C01G 35/00 | (2006.01) |
| C01G 39/06 | (2006.01) |
| C01G 41/00 | (2006.01) |
| C01G 15/00 | (2006.01) |
| C01B 25/00 | (2006.01) |
| B01J 13/00 | (2006.01) |
| C01G 31/02 | (2006.01) |

(52) U.S. Cl.
CPC ............ *C01B 25/003* (2013.01); *C01G 15/00* (2013.01); *C01G 19/00* (2013.01); *C01G 21/00* (2013.01); *C01G 23/007* (2013.01); *C01G 25/00* (2013.01); *C01G 31/00* (2013.01); *C01G 31/02* (2013.01); *C01G 35/00* (2013.01); *C01G 39/06* (2013.01); *C01G 41/00* (2013.01); *C01P 2002/01* (2013.01); *C01P 2002/08* (2013.01); *C01P 2002/34* (2013.01); *C01P 2002/72* (2013.01); *C01P 2002/77* (2013.01); *C01P 2002/82* (2013.01); *C01P 2002/84* (2013.01); *C01P 2004/03* (2013.01); *C01P 2004/04* (2013.01); *C01P 2004/20* (2013.01); *C01P 2004/24* (2013.01); *C01P 2004/64* (2013.01)

(56) References Cited

FOREIGN PATENT DOCUMENTS

| | | |
|---|---|---|
| CN | 103496692 | 1/2014 |
| CN | 103641172 | 3/2014 |
| JP | 2005-220001 A | 8/2005 |
| JP | 2006-233232 A | 9/2006 |
| WO | WO 2013/001266 A1 | 1/2013 |

OTHER PUBLICATIONS

Coleman et al., Two-Dimensional Nanosheets Produced by Liquid Exfoliation of Layered Materials, Science, vol. 331, Feb. 2011.
Ding et al., "Lithium Intercalation and Exfoliation of Layered Bismuth Selenide and Bismuth Telluride", Journal of Materials Chemistry, Feb. 2009.
Eda, et al., "Photoluminescence from Chemically Exfoliated $MoS_2$," Nano letters, 11, pp. 5111-5116, Oct. 2011.
Hernandez et al., "High-Yield Production of Graphene by Liquid-Phase Exfoliation of Graphite", vol. 3, Sep. 2008.
Ji et al., "Exfoliated $MoS_2$ nanosheets as Efficient Catalysts for Electrochemical hydrogen Evolution", Electrochimica Acta, 109, pp. 269-275.
Joensen et al., Single-Layer $MoS_2$, Mat. Res. Bull., vol. 21, pp. 457-461, 1986.
Levy et al., "Single Crystals of Transition Metal Trichalcogenides", Journal of Crystal Growth 61, pp. 61-68, 1983.
Liu, et al., "Phosphorene: A New 2D Material with High Carrier Mobility".
Najmaei et al., Vapour Phase Growth and Grain Boundary Structure of Molybdenum Disulphide Atomic Layers, Nature Materials, Jun. 2013.
Nicolosi et al., "Liquid Exfoliation of Layered Materials", Science, vol. 340, Jun. 2013.
Novoselov et al., "Electric Field Effect in Atomically Thin Carbon Films" Science, vol. 306, Oct. 2004.
Shahil et al., "Crystal Symmetry Breaking in Few-Wuintuple $Bi_2Te_3$ Films: Applications in Nanometrology of Topological Insulators", Balandin Group, University of California, 2010.
Somoano et al., "Alkali Metal Intercalates of Molybdenum Disulfide", The Journal of Chemical Physics, vol. 58, No. 2, Jan. 1973.
Tonndorf et al., Photoluminescence Emission and Raman Response of Monolayer $MoS_2$, $MoSe_2$ and $WSe_2$ Optics Express, vol. 21, No. 4, Feb. 2013.
Wang et al., "Electronics and Optoelectronics of Two-Dimensional Transition Metal Dichalcogenides", Nature Nanotechnology, Nov. 2012.
Woollam, "Physics and Chemistry of $MoS_2$ Intercalation Compounds", Materials Science and Engineering, 31, pp. 289-295, 1977.
Wypych et al., "Electron Diffraction Study of Intercalation Compounds Derived from $1T-MoS_2$" Journal of Solid State Chemistry 144, pp. 430-436, 1999.
Ye et al., "Superconducting Dome in a Gate-Tuned Band Insulator" Science vol. 338, Nov. 2012.
Zeng et al., "Single-Layer Semiconducting Nanosheets: High-Yield Preparation and Device Fabrication" Angew Chem. Int. Ed. 50, pp. 11093-11097, 2011.
Zhang et al., "Experimental Observation of the Quantum Hall Effect and Berry's Phase in Graphene" Nature Publishing Group, vol. 438, Nov. 2015.
Zhao et al., "One-Step Synthesis of Bismuth Telluride Nanosheets of a Few Quintuple Layers in Thickness", Angew Chem. Int. Ed. 50, pp. 10397-10401, 2011.
Zheng et al. "High Yield Exfoliation of Two-Dimensional Chalcogenides Using Sodium Naphthalenide" Nature Communications, vol. 5, Jan. 2014.
Zhu et al., "Electronic Transport and Device Prospects of Monolayer Molybdenum Disulfide Grown by Chemical Vapour Deposition" Nature Communication, Nov. 2013.
Jun Feng et al., "Giant Moisture Resposiveness of VS2 Ultrathin Nanosheets for Novel Touchless Positioning Interface," Advanced Materials, vol. 24, No. 15, Apr. 17, 2012, pp. 1969-1974.
Supporting Information for Jun Feng et al., "Giant Moisture Resposiveness of VS2 Ultrathin Nanosheets for Novel Touchless Positioning Interface," Advanced Materials, vol. 24, No. 15, Apr. 17, 2012, pp. 1969-1974.
Dieter Stoye, "Solvents" in "Ullmann's Encyclopedia of Industrial Chemistry," Jun. 15, 2000, Wiley-VCH.

* cited by examiner

MoS$_2$-Li + THF after 1 week

MoS$_2$ + Li + NH$_3$ after 24 hrs

MoS$_2$ + Li + NH$_3$ after 5 mins 0 minutes    10 minutes    30 minutes    3 hours    12 hours    3 days FeSe Sb$_2$Te$_3$

METHOD FOR PRODUCING DISPERSIONS OF NANOSHEETS

CROSS-REFERENCE TO RELATED APPLICATIONS

This application is the National Stage of International Patent Application No. PCT/GB2015/050433, filed Feb. 16, 2015, which claims the benefit of Great Britain Patent Application No. 1402778.3, filed Feb. 17, 2014 and Great Britain Patent Application No. 1423121.1, filed Dec. 23, 2014, the disclosures of which are incorporated herein by reference in their entireties for any and all purposes.

TECHNICAL FIELD

A method for dissolving a layered material to produce a solution of nanosheets derived from the layered material is described. A plated material produced from the nanosheets is also described.

BACKGROUND ART

Layered materials are highly anisotropic, and exist in bulk form as stacks of 2-dimensional (2D) sheets which together form a 3-dimensional (3D) crystal. The bonding in-plane (i.e. within the layer or sheet) is typically comprised of strong chemical bonds, whereas the layers themselves are held together by weaker forces, for example, van der Waals. Layered materials have been studied for over 100 years, but it is only recently, with the isolation of few layer graphene sheets from graphite in 2004 that few-layer, or even single layer, 'nanosheets' have been isolated and studied in detail [i]. Since then, increasing numbers of different types of nanosheets have been successfully isolated [ii,iii,iv]. These individual nanosheets can be ~mm² in area but are typically ~nm thick.

The nanosheets can have significantly different, and often enhanced, properties compared with their bulk analogues. For example, the nanosheets have: very high surface areas for gas sensing, catalytic supports and battery/supercapacitor electrodes [iii]; modified electronic structure due to the low dimensionality which, for example, leads to remarkably high electron mobilities in graphene [i], and a direct band gap in $MoS_2$ [ii]; and the nanosheets themselves can be directly imbedded into other materials to form functional composites [iii,iv]. Further to this, exotic physics can arise from the 2-dimensional nature of the material [e.g. see v, vi] and these properties can be tuned by incorporating the nanosheets into nanoscale devices [vi].

There are numerous examples of layered materials other than graphite. Some of the main classes and examples include: transition metal dichalcogenides (TMDC), transition metal monochalcogenides, transition metal trichalcogenides (TMTC), transition metal oxides, metal halides, oxychalcogenides and oxypnictides, oxyhalides of transition metals, trioxides, perovskites, niobates, ruthenates, layered III-VI semiconductors, V-VI layered compounds (e.g. $Bi_2Te_3$ and $Bi_2Se_3$) [iv] and black phosphorous. While these have been investigated in the 3-dimensional form, in many cases, they have never been isolated as nanosheets. Some of these materials are described in more detail below.

Transition Metal Dichalcogenides: One major class of layered material is the TMDCs [ii]. These are compounds of transition metals (for example Ti, Zr, Hf, V, Nb, Ta, Cr, Mo, W, Tc, Re, Ni, Pd or Pt) with a chalcogen (sulphur, selenium or tellurium) with the formula $MX_2$, where M is the transition metal and X is the chalcogen. In these materials the transition metal is sandwiched between layers of the chalcogen to form an X-M-X stack or sheet. Within the sheets the bonding is covalent, but between the adjacent sheets the bonding is weak, which permits their exfoliation to form nanosheets. These materials have received significant attention because they exhibit a wide variety of electronic properties including metallicity, semiconductivity, superconductivity and charge density waves [ii]. In particular, there has been extensive focus on $MoS_2$ because in the monolayer form, in contrast to the bulk, this material has a direct band gap making it suitable for nanoelectronic applications [ii].

V-VI layered compounds (e.g. $Bi_2Te_3$ and $Bi_2Se_3$): These materials form in covalently bonded 5-atom stacks/sheets and can be exfoliated into individual nanosheets [iv]. Their main applications are as thermoelectric materials.

Transition metal trichalcogenides (TMTs): These are compounds of transition metals (such as those listed above) with a chalcogen (sulphur, selenium or tellurium) with the formula $MX_3$, where M is the transition metal and X is the chalcogen. Their basic structural elements are prismatic columns of $MX_6$, linked together to build 2D layers [vii]. Metal phosphorous trichalcogenides are transition metal trichalogenides with the formula $MPX_3$, where M is the transition metal, such as Ni or Fe and X is the chalcogen. The latter materials are wide band-gap semiconductors, which suggest optoelectronic applications [iv].

Metal halides: This class includes transition metal halides, which can have formula $MX_2$, $MX_3$, $MX_4$, $MX_5$, and $MX_6$, where M is a metal and X is a halide, for example, $CuCl_2$. These have a wide variety of potentially useful magnetic and electronic properties.

Layered transition metal oxides: This class includes Ti oxides Nb oxides, Mn oxides, and V oxides, which are of interest due to their interesting electronic and dielectric properties with applications in supercapacitors, batteries, as catalysts, dielectric materials and as ferroelectrics [iv].

Trioxides: These include $MoS_3$ and $TaO_3$, which have suggested applications in electrochromic materials and LEDs [iv].

Perovskites and niobites: These include $SrRuO_4$, $H_2W_2O_7$, and $Ba_5TaO_{15}$, which have suggested applications as ferroelectrics and photochromic materials [iv].

Layered III-VI semiconductors: These include GaX (X=S, Se, Te); InX (X=S, Se, Te), which have useful nonlinear optical properties for optoelectronic applications [iv].

The layered allotrope of phosphorous known as 'black phosphorous'. This material has recently been exfoliated into nanosheets to form the so-called 2D material 'phosphorene'. This has a direct band-gap that depends on layer thickness and high carrier mobilities suggesting applications in nanoelectronics [viii].

There is therefore an enormous current global effort investigating the potential of nanosheets for technological applications, or to study the exotic effects that can occur in these materials. However, before the technology can be realised, the first crucial step is to establish protocols to manufacture quantities of high quality nanosheets in a way that is cost-effective and also permits their scalable manipulation into commercial applications.

The two main approaches for producing nanosheets are 'bottom up' and 'top down'. 'Bottom up' methods involve growing nanosheets directly onto surfaces, typically via chemical vapour deposition [e.g see ix]. While growth methods are improving, they are difficult to scale as they are limited by the area, and often high cost, of the starting substrate and require high temperatures [ix] which further adds to the expense. Furthermore, the resulting sheets typically have inferior properties (e.g. electron mobility) compared with exfoliated, single crystal sheets [x]. 'Top down' methods start with the material in the 3D bulk form, and aim to reduce it to its individual component layers in a process known as exfoliation. Exfoliation methods are typically one of two types. The first is so-called 'mechanical exfoliation' where the layers are individually exfoliated, for example, using sticky tape, onto a surface [i]. While this yields high-quality and large-size nanosheets, the process is unpredictable and also difficult to scale. As a result this method is mainly for studying the pristine properties of the nanosheets [e.g. see refs v,vi].

The other exfoliation route is 'liquid exfoliation' [see review article iv and references therein]. Here the layered material is exfoliated into nanosheets in the medium of a liquid to form dispersions of nanosheets. The major advantage of this route is that such dispersions can be used to efficiently manipulate the nanosheets into applications in industrially scalable way. For example, from dispersions the nanosheets can be scalably printed into thin films for plastic electronics, or embedded into functional composites [iv].

Current methods for liquid exfoliation typically rely on sonication or chemical reaction to tear apart the nanosheets from their bulk 3D form in the presence of a liquid [iii,iv,xi]. The most commonly implemented process is ultrasonication in certain chosen organic solvents or solvent blends, such as N-methyl-pyrrolidone (NMP) [iii,xi]. This is necessarily followed by centrifugation to remove larger chunks of unexfoliated material in suspension following sonication. Nanosheet dispersions formed via this method are typically an inhomogeneous mixture of mono- and multilayer flakes [iii,xi], have not yet demonstrated complete exfoliation to monolayer units for all materials and can sediment out of dispersion over time [iii]. Further disadvantages are the fact that the sheets can be damaged by the sonication, and that the necessary centrifugation step is difficult to scale industrially.

A modified method of liquid exfoliation involves first intercalating ions between the sheets of the bulk material in order to separate them [iv, xii, xiii, xiv, xv, xvi, xvii]. This increases the layer spacing and is therefore believed to weaken the interlayer adhesion, facilitating exfoliation [iv]. This is typically followed by chemical reaction of the resulting intercalation compound with, for example, water facilitated by (ultra)sonication [xii, xii, xiv, xv, xvi, xvii]. In this process, the water reacts with intercalated lithium ions, forming hydrogen gas between the layers, which blows them apart into nanosheets [xii, xiv, xv, xvi, xvii]. This method of exfoliation has been demonstrated for TMDCs with intercalation via electrochemical intercalation [xvii], intercalation using the salt lithium butyrate [xii, xiv] and intercalation using sodium naphthalenide [xv], and the case of $Bi_2Te_3$ compounds via intercalation using lithium-ammonia solution [xvi].

The main benefit of intercalation prior to sonication is that the percentage of monolayers in solution is increased compared to basic liquid exfoliation. However, major problems remain. Damaging sonication is still required and the violent reaction with water can also damage the nanosheets. Furthermore, this process can modify the intrinsic properties of the nanosheets which therefore require further processing in an attempt to recover their pristine properties. For example, in the case of $MoS_2$, ~50% of the nanosheets deposited from solution lose their desirable semiconducting properties. This is thought to be due to a distortion of the $MoS_2$ nanosheets into a metallic $1T-MoS_2$ phase as a result of the exfoliation by combined intercalation with lithium and reaction with water [xiv]. The sample has to be subsequently annealed at 300° C. to recover the desired semiconducting $2H-MoS_2$ phase. However, despite this treatment residual structural disorder still remains [xiv]. Further disadvantages with this method are that dispersions formed have been found to only remain in suspension for several days or weeks [xii], and the nanosheets' surface thought to be hydrated with $OH^-$ ions [xviii].

Many other layered materials have been shown to intercalate for example, indium and gallium selenide, $MoO_3$, FeOCl, Heavy Metal Halides, but without demonstration of spontaneous dissolution [iv].

Hence there is a need for a simple yet effective method for producing a thermodynamically stable solution comprising undamaged, unfunctionalised, nanosheets, wherein the method can be scaled up easily to industrial proportions.

To date, the inventors have seen no examples of any of the layered materials listed above being demonstrated to spontaneously dissolve, i.e. dissolve without sonication. In the case of spontaneous dissolution, the individual layers are 'thermodynamically driven' into to the solvent. This happens when there is a gain in free energy resulting from the solvation of the charged nanosheets and intercalant ions compared with the combined free energy of the isolated solvent and bulk material. Also, it is well known by the skilled person that TMDCs do not dissolve spontaneously directly in electronic liquids [xix]. Indeed, it has been demonstrated that Li-intercalated $MoS_2$ exfoliated via water reaction actually flocculates when a variety of organic compounds or solvents are added [xx] rather than maintain the suspension. Indeed, despite many studied intercalates of $MoS_2$, none has been shown to dissolve spontaneously without reaction [xx].

DISCLOSURE OF THE INVENTION

The present invention provides a method for producing a solution of nanosheets comprising the step of:
contacting an intercalated layered material with a polar aprotic solvent to produce a solution of nanosheets, wherein the intercalated layered material is prepared from a layered material selected from the group consisting of a transition metal dichalcogenide, a transition metal monochalcogenide, a transition metal trichalcogenide, a transition metal oxide, a metal halide, an oxychalcogenide, an oxypnictide, an oxyhalide of a transition metal, a trioxide, a perovskite, a niobate, a ruthenate, a layered III-VI semiconductor, black phosphorous and a V-VI layered compound.

The present invention further provides a solution of non-carbon-containing nanosheets, which may be obtainable by this method.

The inventors have found that, by using the method of the present invention, a solution of nanosheets can be produced from an intercalated layered material without the need to agitate the intercalated layered material (e.g. by sonication, stirring or thermal shock), thus avoiding the damage caused by such an agitation process. Rather, the intercalated layered material dissolves spontaneously by a thermodynamically driven process, resulting in a thermodynamically stable solution without the need for an agitation process. The resultant nanosheets may maintain the original in-plane dimensions of the layers of the parent layered material and/or the in-plane crystal structure of the parent layered material and/or may be undistorted, i.e. they may be undamaged. In addition, the nanosheets may be unfolded. Furthermore, as the method of the present invention does not rely on functionalisation of the layered material for causing exfoliation or dissolution, the nanosheets may be unfunctionalised.

The charge on the nanosheets may subsequently be removed and the nanosheets then deposited to form a plated material. The present invention further provides a method for producing a plated material comprising the steps of:
contacting an intercalated layered material with a polar aprotic solvent to produce a solution of nanosheets; and
quenching the nanosheets to form a plated material,
wherein the intercalated layered material is prepared from a layered material selected from the group consisting of a transition metal dichalcogenide, a transition metal monochalcogenide, a transition metal trichalcogenide, a transition metal oxide, a metal halide, an oxychalcogenide, an oxypnictide, an oxyhalide of a transition metal, a trioxide, a perovskite, a niobate, a ruthenate, a layered III-VI semiconductor, black phosphorous and a V-VI layered compound.

The intercalated layered material may be prepared by contacting a layered material with an electronic liquid. Accordingly, the present invention further provides a method for producing a solution of nanosheets, comprising the steps of:
contacting a layered material with an electronic liquid to form an intercalated layered material; and contacting an intercalated layered material with a polar aprotic solvent to produce a solution of nanosheets, wherein the layered material is selected from the group consisting of a transition metal dichalcogenide, a transition metal monochalcogenide, a transition metal trichalcogenide, a transition metal oxide, a metal halide, an oxychalcogenide, an oxypnictide, an oxyhalide of a transition metal, a trioxide, a perovskite, a niobate, a ruthenate, a layered III-VI semiconductor, black phosphorous and a V-VI layered compound. The present invention further provides an intercalated layered material, which may be obtainable by this method.

The present invention further provides a method for producing a plated material comprising the steps of:
contacting a layered material with an electronic liquid to form an intercalated layered material;
contacting an intercalated layered material with a polar aprotic solvent to produce a solution of nanosheets; and
quenching the nanosheets to form a plated material,
wherein the layered material is selected from the group consisting of a transition metal dichalcogenide, a transition metal monochalcogenide, a transition metal trichalcogenide, a transition metal oxide, a metal halide, an oxychalcogenide, an oxypnictide, an oxyhalide of a transition metal, a trioxide, a perovskite, a niobate, a ruthenate, a layered III-VI semiconductor, black phosphorous and a V-VI layered compound. The present invention further provides a plated material, which may be obtainable by one or both of the above methods.

The inventors have found that, by using the method of the present invention, a bulk plated material, potentially having a high surface area of nanosheets, can be produced. The material may have the useful properties that occur only in the nanosheet form, e.g. the modification of electronic properties or the enhancement of catalytic properties. The plated material may have the in-plane crystal structure of the layered material from which it is derived. The nanosheets contained within the plated material may be undistorted.

DETAILED DESCRIPTION OF THE INVENTION

Figures

Figure 1:
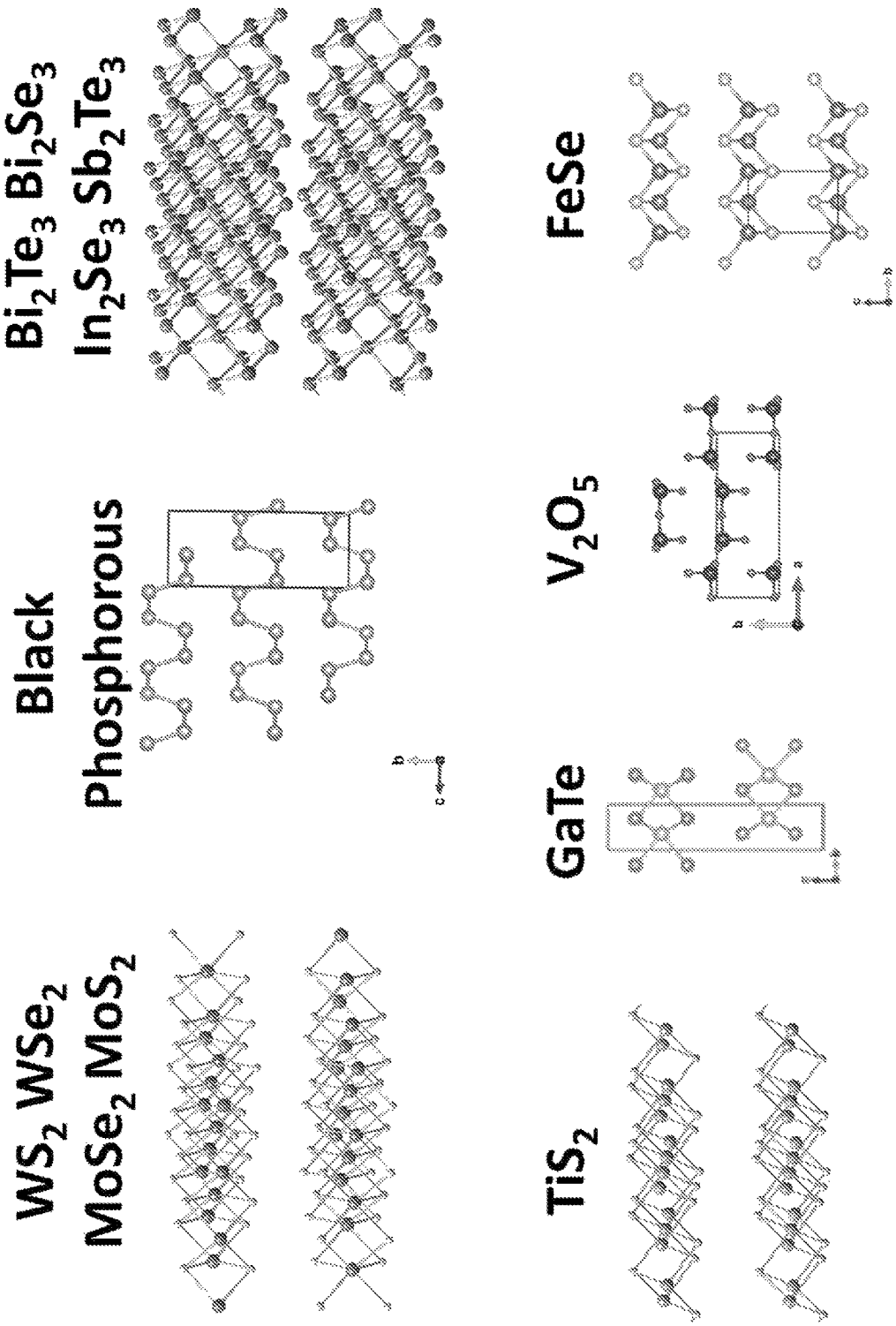
FIG. 1 is a schematic representation of the crystal structures of thirteen layered materials that may be used in the invention.

FIGS. 7a-d is a series of AFM images and associated linescans of nanosheets formed from twelve layered materials.

FIG. 8 is a series of TEM images/diffraction of nanosheets formed from seven layered materials.

FIG. 9 (a-d) is electrochemically plated $Bi_2Te_3$: a) Optical micrographs of (a) positive electrode and (b) negative electrode showing grids of positions where Raman spectra were taken. c) Typical Raman spectra of deposited $Bi_2Te_3$ nanosheets taken from (a). d) Intensity map of $Bi_2Te_3$ Raman nanosheet feature for positions of the grid in (a). FIG. 9 (e-g) is electrochemically plated $MoSe_2$: e) Optical micrograph of the positive electrode post plating f) Raman intensity map of the silicon peak at ~520 $cm^{-1}$ (g) Raman intensity map of the $MoSe_2$ peak at ~241 $cm^{-1}$ (units on x and y are in microns).

Various embodiments of the invention are described herein. It will be recognised that features specified in each embodiment may be combined with other specified features to provide further embodiments.

Layered Material

The term "layered material" is used herein to describe materials that exist in bulk form as stacks of 2D layers which form a 3D crystal. The layered material (and, therefore, the intercalated layered material) discussed herein is a non-carbon-containing layered material. In particular, the layered material is a non-graphite layered material, i.e. it is not graphite or a derivative thereof. Nevertheless, the layered material may contain carbon impurities, e.g. it may contain up to 1% i.e. 10000 ppm carbon impurities.

In one embodiment, the layered material is an aprotic layered material. Specifically, in the same way that an aprotic solvent cannot donate a hydrogen ion (proton), an "aprotic layered material" is a material that does not have a "protic surface", i.e. a surface with readily accessible $H^+$ ions. In one embodiment, the aprotic layered material does not contain hydrogen in its structural unit (although the edges of the layers making up the material may be terminated with hydrogen). A mixture of layered materials may be used. The layered material may be used in any form, e.g. in the form of a powder, or a crystal, or the layered material may be provided as a film on a substrate. In one embodiment, the aprotic layered material does not contain protons that are capable of forming hydrogen bonds in solution.

The layered material is selected from a transition metal dichalcogenide, a transition metal monochalcogenide, a transition metal trichalcogenide, a transition metal oxide, a metal halide, an oxychalcogenide, an oxypnictide, an oxyhalide of a transition metal, a trioxide, a perovskite, a niobate, a ruthenate, a layered III-VI semiconductor, black phosphorous and a V-VI layered compound. In one embodiment, the layered material is selected from the group consisting of a transition metal dichalcogenide, a transition metal trichalcogenide, a transition metal oxide, a metal halide, an oxychalcogenide, an oxypnictide, an oxyhalide of a transition metal, a trioxide, a perovskite, a niobate, a layered III-VI semiconductor, black phosphorous and a V-VI layered compound. In another embodiment, the layered material is selected from the group consisting of a transition metal dichalcogenide, a transition metal monochalcogenide, a transition metal trichalcogenide, a transition metal oxide, a layered III-VI semiconductor, black phosphorous and a V-VI layered compound. In another embodiment, the layered material is selected from the group consisting of a transition metal dichalcogenide, a transition metal monochalcogenide, a transition metal oxide, a layered III-VI semiconductor, black phosphorous and a V-VI layered compound. In another embodiment, the layered material is selected from the group consisting of a transition metal dichalcogenide, a transition metal trichalcogenide, a layered III-VI semiconductor, black phosphorous and a V-VI layered compound. In another embodiment, the layered material is selected from the group consisting of a transition metal dichalcogenide, a transition metal trichalcogenide, a layered III-VI semiconductor, and a V-VI layered compound. In another embodiment, the layered material is selected from the group consisting of a transition metal dichalcogenide, a transition metal trichalcogenide, black phosphorous and a V-VI layered compound. In another embodiment, the layered material is selected from the group consisting of a transition metal dichalcogenide and a V-VI layered compound. In one embodiment, the layered material is a transition metal dichalcogenide. In another embodiment, the layered material is a V-VI layered compound. In another embodiment, the layered material is a transition metal monochalcogenide. In another embodiment, the layered material is a transition metal oxide. In another embodiment, the layered material is a layered III-VI semiconductor. In another embodiment, the layered material is black phosphorous. The V-VI layered compound may be selected from the group consisting of $Bi_2Te_3$, $Bi_2Se_3$, and $Sb_2Te_3$. The V-VI layered compound may be selected from the group consisting of $Bi_2Te_3$ and $Bi_2Se_3$. In one embodiment, the transition metal is selected from the group consisting of Ti, Zr, Hf, V, Nb, Ta, Cr, Mo, W, Tc, Re, Ni, Pd and Pt. In one embodiment, the metal halide is a transition metal halide. In one embodiment, the halide is selected from a fluoride, a chloride, a bromide and an iodide. In a further embodiment, the halide is a chloride.

In one embodiment, the layered material is selected from the group consisting of $MoS_2$, $WS_2$, $TiS_2$, $NbSe_2$, $NbTe_2$, $TaS_2$, $MoSe_2$, $MoTe_2$, $WSe_2$, $Bi_2Te_3$, $Bi_2Se_3$, FeSe, GaS, GaSe, GaTe, $In_2Se_3$, $TaSe_2$, $SnS_2$, $SnSe_2$, $PbSnS_2$, $NiTe_3$, $SrRuO_4$, $V_2O_5$, $ZrSe_2$, $ZrS_3$, $HfTe_2$, $Sb_2Te_3$ and black phosphorous. In one embodiment, the layered material is selected from the group consisting of $MoS_2$, $WS_2$, $TiS_2$, $NbSe_2$, $NbTe_2$, $TaS_2$, $MoSe_2$, $MoTe_2$, $WSe_2$, $Bi_2Te_3$, $Bi_2Se_3$, FeSe, GaS, GaSe, $In_2Se_3$, $TaSe_2$, $SnS_2$, $SnSe_2$, $PbSnS_2$, $NiTe_3$, $SrRuO_4$, $V_2O_5$, $ZrSe_2$ and black phosphorous. In one embodiment, the layered material is selected from the group consisting of $MoS_2$, $WS_2$, $TiS_2$, $NbSe_2$, $NbTe_2$, $TaS_2$, $MoSe_2$, $MoTe_2$, $WSe_2$, $Bi_2Te_3$, $Bi_2Se_3$, GaS, GaSe, $In_2Se_3$, $TaSe_2$, $SnS_2$, $SnSe_2$, $PbSnS_2$, $NiTe_3$, $SrRuO_4$, $V_2O_5$, $ZrSe_2$ and black phosphorous. In one embodiment, the layered material is selected from the group consisting of $MoS_2$, $WS_2$, $TiS_2$, $Bi_2Te_3$, FeSe, $V_2O_5$, $Bi_2Se_3$, $In_2Se_3$, $WSe_2$, $MoSe_2$, GaTe, $ZrS_3$, $HfTe_2$, $Sb_2Te_3$ and black phosphorous. In one embodiment, the layered material is selected from the group consisting of $MoS_2$, $WS_2$, $TiS_2$, $Bi_2Te_3$, FeSe, $V_2O_5$, $Bi_2Se_3$, $In_2Se_3$, $WSe_2$, $MoSe_2$, GaTe, $Sb_2Te_3$ and black phosphorous. In one embodiment, the layered material is selected from the group consisting of $MoS_2$, $WS_2$, $TiS_2$ and $Bi_2Te_3$, FeSe, $V_2O_5$, $Bi_2Se_3$, $In_2Se_3$, $WSe_2$, $MoSe_2$, and black phosphorous. In one embodiment, the layered material is selected from the group consisting of $MoS_2$, $WS_2$, $TiS_2$ and $Bi_2Te_3$, $V_2O_5$, $Bi_2Se_3$, $In_2Se_3$, $WSe_2$, $MoSe_2$, and black phosphorous. In another embodiment, the layered material is selected from the group consisting of $MoS_2$, $WS_2$, $TiS_2$, and $Bi_2Te_3$. In a specific embodiment, the layered material is $MoS_2$. In another specific embodiment, the layered material is $WS_2$. In a further specific embodiment, the layered material is $Bi_2Te_3$. In a further specific embodiment, the layered material is $TiS_2$. In a further specific embodiment, the layered material is $V_2O_5$. In a further specific embodiment, the layered material is $Bi_2Se_3$. In a further specific embodiment, the layered material is $In_2Se_3$. In a further specific embodiment, the layered material is $WSe_2$. In a further specific embodiment, the layered material is $MoSe_2$. In a further specific embodiment, the layered material is black phosphorous. In a further specific embodiment, the layered material is FeSe. In a further specific embodiment, the layered material is GaTe. In a further specific embodiment, the layered material is $ZrS_3$. In a further specific embodiment, the layered material is $HfTe_2$. In a further specific embodiment, the layered material is $Sb_2Te_3$.

The term "intercalated layered material" is used herein to describe a layered material in which one or more guest species (i.e. a species that is not found in the layered material in its native form) is inserted between the layers of the material. The guest species may be an atomic, molecular or ionic species, such as an alkali metal or an alkaline earth metal (the person skilled in the art will appreciate that metal atoms or metal ions may be intended according to the context in which "alkali metal" and "alkaline earth metal" are used). The intercalated layered material may be prepared by any suitable method. For instance, the intercalated layered material may be prepared by a method step selected from the group consisting of contacting a layered material with an electronic liquid, reduction of a layered material by a vapour phase of the intercalant, immersion of a layered material in a molten intercalant, use of a charge transfer agent, electrochemical driven intercalation, and reduction of a layered material by a polyaryl salt in an aprotic solvent. Methods of reduction by an alkali metal in the vapour phase, electrochemical driven intercalation and reduction by a polyaryl alkali salt are described in US2011/0130494 A1 (see, in particular, paragraphs [0020]-[0023]), which is incorporated herein by reference. In one embodiment, the intercalated layered material is formed by a method step selected from the group consisting of contacting a layered material with an electronic liquid, reduction of a layered material by a vapour phase of the intercalant, electrochemical intercalation of the layered material, intercalation via immersion of the layered material in molten intercalant, and intercalation of the layered material via use of a charge transfer agent for example, butyl-lithium or lithium borohydride. In one embodiment, the intercalated layered material is formed by intercalation of the layered material via use of a charge transfer agent. In another embodiment, the intercalated layered material is formed by reduction of a layered material by a vapour phase of the intercalant. In a preferred embodiment, the intercalated layered material is formed by contacting a layered material with an electronic liquid. In this embodiment, the guest species is the electronic liquid and hence metal, amine solvent and solvated electrons will be intercalated between the layers. This has the effect of charging the layers, i.e. the solvated electrons present in the electronic liquid reduce the layered material.

The use of an electronic liquid is advantageous because it avoids the high temperatures required by some other routes for forming intercalated layered materials that would decompose some bulk materials. In addition, electronic liquids can be the only way certain layered materials can be intercalated. In addition, electronic liquids can be the only way to intercalate certain ions. In addition the solvent in the electronic liquid can also (as well as the ion) intercalate the layered material, which may be beneficial for subsequent exfoliation. Electronic liquids can also scavenge any impurities present (e.g. water, oxygen), which could degrade the resulting intercalated layered material, and reduces metal wastage as compared to some other routes (e.g. vapour transport). Furthermore, the use of an electronic liquid may facilitate the preparation of a homogenous intercalated layered material.

In one embodiment, the guest species is selected from the group consisting of an alkali metal and an alkaline earth metal. In one embodiment, the guest species is an alkali metal. In one embodiment the guest species is a rare earth metal (e.g. Eu or Yb). The stoichiometric ratio of alkali metal:structural unit (e.g. $MoS_2$ unit) of the layered material in the intercalated layered material may be about 5:1 or less, or from about 5:1 to about 1:200, or about 2:1 or less, or from about 2:1 to about 1:100, or about 1:1 or less, or from about 1:1 to about 1:100, or about 1:6 or less, or from about 1:6 to about 1:100, or about 1:8 or less, or from about 1:8 to about 1:100, or about 1:10 or less, or from about 1:10 to about 1:100, or about 1:15 or less, or from about 1:15 to about 1:100, or about 1:20 or less, or from about 1:20 to about 1:100, or about 1:30 or less, or from about 1:30 to about 1:100, or about 1:40 or less, or from about 1:40 to about 1:100, or about 1:50 or less, or from about 1:50 to about 1:75. The molar ratio of metal atoms to structural units can be determined from their relative masses by simple calculations with which the person skilled in the art will be familiar.

Nanosheets

The term "nanosheets" is used herein to describe products derived from layered materials that comprise or consist essentially of a monolayer (i.e. a single sheet or layer) of the parent layered material or a small number (ten or less) of stacked monolayers of the parent layered material. For instance, a monolayer of $MoS_2$ comprises a single X-M-X stack or sheet. The nanosheets discussed herein are non-carbon-containing nanosheets. In particular, they are not graphenes or derivatives thereof. Nevertheless, the nanosheets may contain carbon impurities, e.g. they may contain up to 1% or 10000 ppm carbon impurities. The nanosheets produced by the method of the invention are charged, although this charge may subsequently be removed in a quenching step. The nanosheets may be derived from the layered materials listed above, e.g. the nanosheets may be derived from a layered material selected from the group consisting of a transition metal dichalcogenide, a transition metal monochalcogenide, a transition metal trichalcogenide, a transition metal oxide, a metal halide, an oxychalcogenide, an oxypnictide, an oxyhalide of a transition metal, a trioxide, a perovskite, a niobate, a ruthenate, a layered III-VI semiconductor, black phosphorous and a V-VI layered compound.

In one embodiment, the nanosheets comprise ten or less stacked monolayers. In an alternative embodiment, the nanosheets comprise eight or less stacked monolayers. In an alternative embodiment, the nanosheets comprise six or less stacked monolayers. In an alternative embodiment, the nanosheets comprise four or less stacked monolayers. In an alternative embodiment, the nanosheets comprise three or less stacked monolayers. In an alternative embodiment, the nanosheets comprise two or less stacked monolayers. In an alternative embodiment, the nanosheets comprise monolayers. As a consequence of the method of the present invention, the nanosheets are dispersed, which means that each nanosheet, whether it is mono-layer, bi-layer, tri-layer etc. is a separate individual moiety, i.e. the solution is a solution of individual nanosheets. The solution of nanosheets produced by the method of the present invention may comprise a mixture of nanosheets, such as a mixture of mono-, bi-, tri- and 4-layer nanosheets. In an alternative embodiment, the solution comprises only mono-, bi- and tri-layer nanosheets. In a further embodiment, the solution comprises only tri-layer nanosheets. In an alternative embodiment, the solution comprises only mono- and bi-layer nanosheets. In a further embodiment, the solution comprises only bilayer nanosheets. In an alternative embodiment, the solution comprises only monolayer nanosheets.

The term "mono-dispersed" is used herein to describe a solution wherein the dispersed individual nanosheets comprised within the solution all have essentially the same dimensions i.e. the same size and shape. Thus, in one embodiment, the solution of nanosheets produced by the method of the present invention may comprise mono-dispersed nanosheets, such as mono-dispersed monolayers. In particular, the term "mono-dispersed" is used to describe a solution wherein the dimensions of the individual nanosheets which comprise the solution have a standard deviation of less than about 20%, in one embodiment, less than about 15%, in another embodiment, less than about 10%, in a further embodiment, less than about 5%.

In one embodiment, the nanosheets are unfunctionalised nanosheets, i.e. there are no atoms or molecules covalently bonded to the nanosheets that were not part of the parent layered material. In other words, although the nanosheets may be charged, they are not otherwise chemically modified as compared to the sheets of the bulk layered material.

In another embodiment, the nanosheets are undamaged, i.e. they substantially retain the original in-plane dimensions of the layers of the parent layered material (as opposed to the out-of-plane dimension, or thickness of the stack of layers making up the parent material) and/or the in-plane crystal structure of the parent layered material and/or are undistorted. More specifically, they may retain at least 95% of the in-plane dimensions of the layers of the parent layered material, or at least 90% of the in-plane dimensions of the layers of the parent layered material. In a further embodiment, the nanosheets are unfunctionalised and undamaged. In a further embodiment, the nanosheets are unfolded.

The present invention provides a "solution" of nanosheets, in other words a homogeneous mixture in which the nanosheets are dissolved in a solvent. The solution may comprise a polar aprotic solvent. In one embodiment, the nanosheets are charged. In a further embodiment, the nanosheets are unfunctionalised. In a further embodiment, the nanosheets have the in-plane crystal structure of the parent layered material. In a further embodiment, the nanosheets are undistorted. In a further embodiment, the solution of nanosheets is thermodynamically stable. The term "thermodynamically stable" is used herein to refer to a solution in which the dissolved species do not precipitate or "crash out" (when the solution is retained under the conditions (e.g. temperature, pressure, atmosphere etc.) under which it was formed). In particular, the term "thermodynamically stable" is used to refer to a solution in which the dissolved species do not precipitate or "crash out" over a period of one month or more, or over a period of two months or more, or over a period of three months or more, or over a period of four months or more, or over a period of six months or more, or over a period of nine months or more, or over a period of a year or more.

The solution may comprise nanosheets at a concentration of about 0.001 mg/ml or greater, about 0.01 mg/ml or greater, about 0.05 mg/ml or greater, about 0.1 mg/ml or greater, about 0.5 mg/ml or greater, about 1 mg/ml or greater, about 5 mg/ml or greater, about 10 mg/ml or greater, or about 100 mg/ml or greater.

Polar Aprotic Solvent

Polar aprotic solvents do not have an acidic hydrogen and are able to stabilize ions. The skilled person will be familiar with suitable polar aprotic solvents for use in the method of the present invention. The polar aprotic solvent may be selected from the group consisting of tetrahydrofuran (THF), dimethyl sulfoxide, ethers (such as dioxane), amides (such as dimethylformamide (DMF) and hexamethylphosphorotriamide), N-methyl pyrrolidone (NMP), acetonitrile, $CS_2$, N-cyclohexyl-2-pyrrolidone, dimethyl sulfoxide (DMSO) and amine solvents (such as ammonia and methylamine) and mixtures thereof. In one embodiment, the polar aprotic solvent is selected from tetrahydrofuran, dimethylformamide, N-methyl pyrrolidone and mixtures thereof. The polar aprotic solvent may be selected according to the layered material. Thus, in one embodiment, the layered material is $MoS_2$ and the polar aprotic solvent is N-methyl pyrrolidone, tetrahydrofuran or dimethylformamide. In another embodiment, the layered material is $Bi_2Te_3$ and the polar aprotic solvent is N-methyl pyrrolidone or dimethylformamide. In another embodiment, the layered material is $WS_2$ and the polar aprotic solvent is tetrahydrofuran, N-methyl pyrrolidone, or dimethylformamide. In another embodiment, the layered material is $TiS_2$ and the polar aprotic solvent is tetrahydrofuran, N-methyl pyrrolidone, or dimethylformamide. In another embodiment, the layered material is FeSe and the polar aprotic solvent is tetrahydrofuran, N-methyl pyrrolidone, or dimethylformamide. In another embodiment, the layered material is $V_2O_5$ and the polar aprotic solvent is tetrahydrofuran, N-methyl pyrrolidone, or dimethylformamide. In another embodiment, the layered material is $Bi_2Se_3$ and the polar aprotic solvent is tetrahydrofuran, N-methyl pyrrolidone, or dimethylformamide. In another embodiment, the layered material is $In_2Se_3$ and the polar aprotic solvent is tetrahydrofuran, N-methyl pyrrolidone, or dimethylformamide. In another embodiment, the layered material is black phosphorous and the polar aprotic solvent is tetrahydrofuran, N-methyl pyrrolidone, or dimethylformamide. In another embodiment, the layered material is $WSe_2$ and the polar aprotic solvent is tetrahydrofuran, N-methyl pyrrolidone, or dimethylformamide. In another embodiment, the layered material is $MoSe_2$ and the polar aprotic solvent is tetrahydrofuran, N-methyl pyrrolidone, or dimethylformamide. The polar aprotic solvent that is contacted with the intercalated layered material may be referred to herein as the first polar aprotic solvent to distinguish it from the second polar aprotic solvent, which is a component of the electronic liquid, discussed below.

In one embodiment, the polar aprotic solvent used in the method of the present invention is a dry polar aprotic solvent. The term "dry polar aprotic solvent" as used herein means that the polar aprotic solvent may comprise about 1500 ppm water or less, or about 1000 ppm water or less, or about 500 ppm water or less, or about 200 ppm water or less, or about 100 ppm water or less, or about 50 ppm water or less, or about 25 ppm water or less, or about 20 ppm water or less, or about 15 ppm water or less, or about 10 ppm water or less, or about 5 ppm water or less, or about 2 ppm water or less, or about 1 ppm water or less. The person skilled in the art will be familiar with methods for obtaining dry solvents, e.g. by using molecular sieves.

It is also preferred to exclude air from the system by ensuring that all materials are oxygen-free (i.e. that no oxygen is adsorbed to the materials). The skilled person will appreciate that it is not possible to establish a completely oxygen-free environment. Thus, as used herein, the term "oxygen-free" refers to an environment in which the content of oxygen is about 5 ppm or less. The steps of the method of the invention, e.g. the step of contacting an intercalated layered material with a polar aprotic solvent to produce a solution of nanosheets, may therefore be carried out in an oxygen-free environment. Similarly, the step of preparing the intercalated layered material by contacting a layered material with an electronic liquid to form an intercalated layered material may be carried out in an oxygen-free environment.

The step of contacting the intercalated layered material with a polar aprotic solvent may take place over any suitable duration to effect dissolution of the nanosheets. For instance, the contacting step may take place over 1 minute or more, over 1 hour or more, or over 2 hours or more, or over 12 hours or more, or over 24 hours or more, or over 48 hours or more, or over a week or more, or over a month or more. The solutions of nanosheets are thermodynamically stable in the polar aprotic solvent and may thus be stored in it. Thus, the solutions of nanosheets may remain stable over a period of one month or more, or over a period of three months or more, or over a period of six months or more, or over a period of nine months or more, or over a period of a year or more.

The conditions of the contacting step are chosen to ensure that the polar aprotic solvent is present as a liquid throughout. Specifically, the temperature and pressure of the contacting step are chosen to avoid the polar aprotic solvent boiling or freezing.

According to the method of the present invention, a solution of nanosheets can be produced from an intercalated layered material by spontaneous dissolution, i.e. the intercalated layered material can spontaneously dissolve in the polar aprotic solvent to produce the solution of nanosheets. Therefore, agitation (including sonication, ultrasonication, stirring and/or thermal shock) is not required for a solution to be formed. Nevertheless, agitation may be used in method of the present invention to facilitate and/or accelerate dissolution, or to maximise the concentration of nanosheets in the solution. However, in one embodiment, the method of the present invention does not include a step of agitating the intercalated layered material by sonication or thermal shock, particularly to effect dissolution.

Electronic Liquid

The term "electronic liquid" is used herein to describe the liquids which are formed when a metal, such as an alkali metal (e.g. sodium), an alkaline earth metal (e.g. calcium), or a rare earth metal (e.g. Europium or Ytterbium), dissolves without chemical reaction into a polar aprotic solvent—the prototypical example being ammonia. This process releases electrons into the solvent forming a highly reducing solution. In other words, the term "electronic liquid" may be used herein to describe a solution comprising solvated electrons.

In one embodiment, the electronic liquid comprises a metal and a second polar aprotic solvent. The metal used in the method of the present invention is a metal which dissolves in a polar aprotic solvent, in particular an amine solvent, to form an electronic liquid. The person skilled in the art will be familiar with appropriate metals. Preferably, the metal is selected from the group consisting of alkali metals, alkaline earth metals, rare earth metals and mixtures thereof. Preferably, the metal is selected from the group consisting of alkali metals, alkaline earth metals and mixtures thereof. Preferably, the metal is an alkali metal, in particular, lithium, sodium or potassium. In one embodiment, the metal is lithium. In another embodiment, the metal is sodium. In an alternative embodiment, the metal is potassium. Alternatively, the metal may be an alkaline earth metal such as calcium. In one embodiment, a mixture of metals may be used to form the electronic liquid.

It is advantageous to control carefully the amount of metal included in the solution. The stoichiometric ratio of alkali metal:structural unit in the electronic liquid may be selected from those listed above for the stoichiometric ratio of alkali metal:structural unit of the layered material in the intercalated layered material.

The second polar aprotic solvent may be selected from those listed above. In one embodiment, preferably the second polar aprotic solvent is an amine solvent. In some embodiments, the amine solvent may be ammonia or an alkylamine, such as a $C_1$ to $C_{12}$ amine, a $C_1$ to $C_{10}$ amine, a $C_1$ to $C_8$ amine, a $C_1$ to $C_6$ amine, or a $C_1$ to $C_4$ amine. The amine solvent is preferably selected from ammonia, methylamine or ethylamine. In one embodiment, the amine solvent is ammonia. In an alternative embodiment, the amine solvent is methylamine.

In one embodiment, the electronic liquid is formed by contacting a metal with the second polar aprotic solvent, preferably an amine solvent in a ratio of about 1:2, about 1:3, about 1:4, about 1:5, about 1:6, or about 1:7. In one embodiment, the electronic liquid is formed by contacting a metal with a polar aprotic solvent, preferably an amine solvent, in a ratio in the range from about 1:2 to about 1:1000, or from about 1:2 to about 1:100, or about 1:2 to about 1:50, or about 1:2 to about 1:20, or about 1:3 to about 1:10, or about 1:4 to about 1:8.

In one embodiment, the metal is an alkali metal and the second polar aprotic solvent is an amine solvent. In a specific embodiment, the metal is lithium and the amine solvent is ammonia. In one embodiment, the metal is sodium and the amine solvent is ammonia. In one embodiment, the metal is potassium and the amine solvent is ammonia. In one embodiment, the metal is sodium and the amine solvent is methylamine. In one embodiment, the metal is lithium and the amine solvent is methylamine. In one embodiment, the metal is potassium and the amine solvent is methylamine.

In one embodiment, the intercalated layered material is isolated from the excess electronic liquid prior to contact with the polar aprotic solvent. In an alternative embodiment, the intercalated layered material is contacted with the polar aprotic solvent directly after contact with the electronic liquid i.e. without prior removal of the excess liquid such that all the second polar aprotic solvent is still present during the contacting with the polar aprotic solvent.

Quenching

"Quenching" refers to the removal of charge (partially or completely) from nanosheets.

The quenching step of the method of the invention may comprise electrochemically quenching the nanosheets and/or chemically quenching the nanosheets to form a "plated material". The term "plated material" is used herein to describe the material formed by depositing nanosheets derived from a layered material. The nanosheets may be deposited with the same structure as the parent layered material to form a "restacked" plated material. Alternatively, the nanosheets may be deposited with a different structure to the parent layered material to form a "turbostratically stacked" plated material. A further alternative, which may be obtained when the plated material is formed from a dilute solution of nanosheets, is for the nanosheets to be deposited so that they lie separately, i.e. an "unstacked" plated material. Therefore, in one embodiment, the plated material is selected from the group consisting of a restacked plated material, a turbostratically stacked plated material and an unstacked plated material. In one embodiment, the plated material (or, more specifically, the nanosheets that make up the plated material) is undistorted.

In one embodiment, the quenching step comprises electrochemically quenching the nanosheets. In this case, the additional charge on the individual nanosheets is removed by applying a voltage to an (otherwise inert) electrode (e.g. a platinum-coated silicon wafer) placed in the solution of nanosheets. The nanosheets therefore "plate out" of solution onto the electrode. In this way, a "plated material" may be constructed on the electrode.

By controlling the potential of the electrode, nanosheets of different electron affinities can be oxidised and precipitated onto the electrode, allowing selective deposition of nanosheets (e.g. those comprising bilayers). The electrode (or series of working electrodes) may be held at fixed potential(s), in potentiostatic mode, or increased from zero. A counter electrode may also be provided, preferably in a remote, though ionically-linked compartment, at which the metal counter ion is reduced and recovered. A reference electrode may be used to control the potential at the working electrode accurately.

The electrochemical quenching step described above offers a controllably scalable method to deposit nanosheets, allowing large-scale, targeted, high-precision deposition of nanosheets; control over the thickness of nanosheets deposited; simultaneous removal of cations that might be detrimental to properties and difficult to remove using standard methods (e.g. spraying or dropcoating); and quenching of the charge without a potentially damaging chemical reaction. In particular, the inventors have found electrochemical quenching of the charged nanosheets from solution, onto patterned electrodes, can be used to efficiently assemble films of the plated material of nanosheets in a highly controllable way.

In one embodiment, the quenching step comprises chemically quenching the nanosheets, which may be carried out by addition of a suitable quenching agent, including but not limited to $O_2$, $H_2O$, $I_2$, and alcohols (or other protic species). As the quenching agent is added, the species with the highest energy electrons will be deposited from solution first. Thus, a plated material may be formed by the nanosheets deposited from solution.

The gradual quenching of the charge by either of these methods (e.g. by controlling the potential of the electrode, or by adding appropriate stoichiometric quantities), may also allow desired fractions of nanosheets to be separated. For example, the fractions precipitated after neutralising predetermined amounts of the total charge may be collected.

Alternatively, or in an additional step, the solvent may gradually be removed, causing the heaviest/least charged species to deposit first. These mechanisms allow separation by, for example, nanosheet dimensions on the one hand, and nanosheet electronic character on the other.

Quenching agents including but not limited to RX, wherein R is a hydrocarbon group (e.g. $C_{1-6}$alkyl) and X is a suitable leaving group (e.g. Cl, Br or I), can be used to chemically modify the nanosheets. Thus, in one embodiment, the method of the invention further comprises the step of functionalising the nanosheets by contacting the nanosheets with RX. By carrying out the reaction on solutions of individual nanosheets, an ideally uniform functionalisation is achieved over the nanosheet surface. In one embodiment, the method of the invention further comprises the step of functionalising the nanosheets by one or more graft(s) of functional groups.

Optionally, two or more layered materials can be dissolved in the same solvent, which can then be subsequently removed to yield a restacked or turbostratically stacked composite material of the two different layered materials.

In one embodiment, the method of the invention further comprises the step of removing the solvent by freeze drying to produce an aerogel of the nanosheets.

General

The term "comprising" encompasses "including" as well as "consisting" e.g. a composition "comprising" X may consist exclusively of X or may include something additional e.g. X+Y.

The term "about" in relation to a numerical value x means, for example, x±10%.

MODES FOR CARRYING OUT THE INVENTION

Example

Nanosheets

Figure 2:
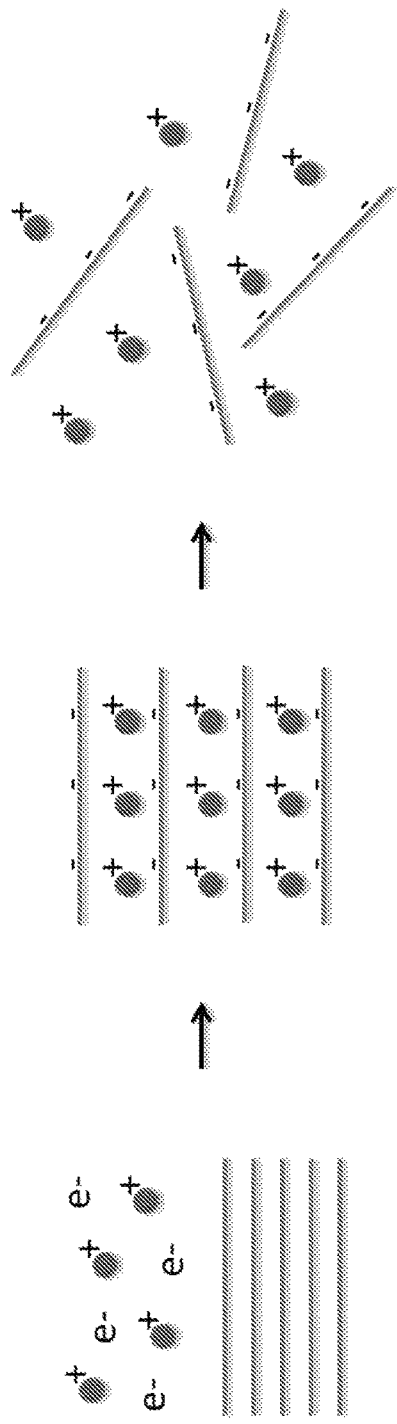
FIG. 2 is an illustration of the method of the present invention.
Figure 2:
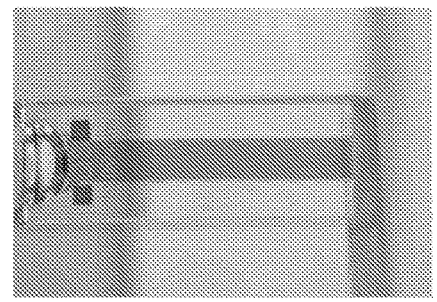
Figure 2:
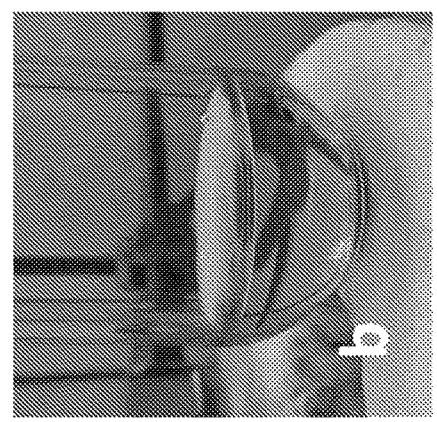
Figure 2:
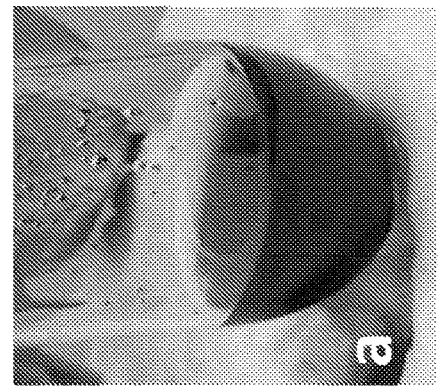
Figure 3:
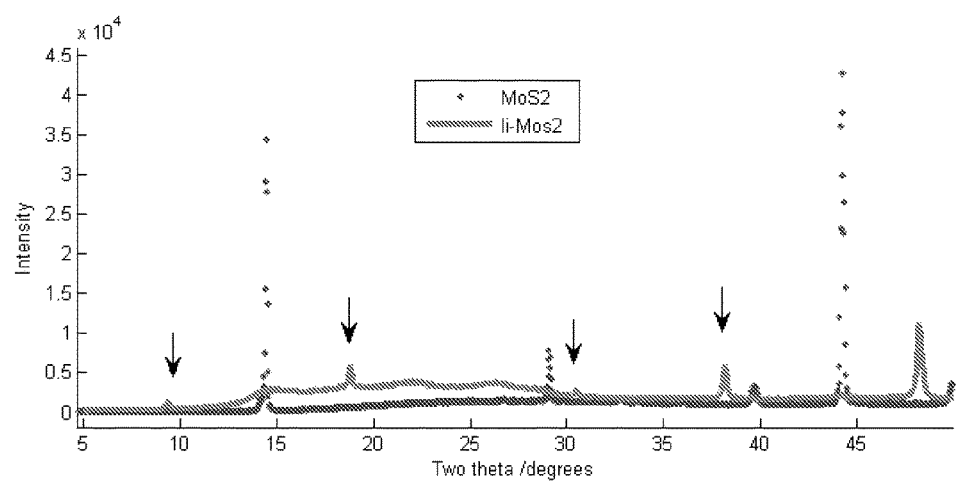
FIG. 3 is X-ray diffraction patterns of pristine bulk $MoS_2$ and lithium intercalated $MoS_2$.

The layered materials listed in Table 1 were outgassed by heating at the temperatures listed in Table 1 at pressures of <$10^{-6}$ mbar (obtained using a turbopump) in order to remove adsorbed species. The temperature is carefully controlled to be below that at which the layered material decomposes. The metal (as indicated in Table 1) was added to the outgassed layered material such that the stoichiometric ratio of alkali metal:structural unit in the layered material was typically ~1:1 or less. Liquid ammonia was then condensed onto the outgassed layered material and metal at 230K. This was done using a pre-cleaned, pre-baked, high-integrity, leak-tight gas-handling manifold. The reaction was left for more than 24 hours for the intercalation to take place. Upon immediate condensation of the liquid ammonia onto the alkali metal, a deep blue liquid formed (FIG. 2). This is a well-known signature of the presence of solvated electrons. When the charge transfer/intercalation was complete, the solution colour turned from blue to colourless as the electrons transferred from solution and into to the layered material (FIG. 2). This was followed by removal of the ammonia to leave the intercalated layered material. The intercalation of lithium-ammonia into $MoS_2$ was investigated using X-ray diffraction, which showed an increase of the interlayer spacing from ~6.15 Å to ~9.5 Å as expected as the intercalant was accommodated between the $MoS_2$ sheets [xix] (FIG. 3). The intercalated layered material was then removed, without exposure to air, into a high integrity argon glovebox where it was contacted with anhydrous, polar aprotic solvent (as listed in Table 1) which had been dried further with molecular sieves. The resulting solutions were left to spontaneously dissolve, without exposure to air or moisture and without any form of mechanical agitation such as stirring or sonication. After one week of dissolution the properties of the solution were investigated.

The above process is shown in FIG. 2.

TABLE 1

| Layered material | Heating temperature | Aprotic solvent | Crystal structure | Metal | Solution Colour |
|---|---|---|---|---|---|
| $MoS_2$ (powder from Aldrich < 2 μm) | 300° C. | NMP or DMF or THF | FIG. 1 | Li, Na, or K | Yellow brown |
| $Bi_2Te_3$ (powder from Aldrich −325 mesh) | 200° C. | NMP or DMF | FIG. 1 | K | Browny orange |
| $WS_2$ (powder from Aldrich < 2 μm) | 300° C. | THF or NMP or DMF | FIG. 1 | Li | Yellow-Orange |
| $TiS_2$ (powder from Aldrich, −200 mesh < 75 μm) | 300° C. | THF or NMP or DMF | FIG. 1 | Li | Browny orange |
| FeSe (Alfa Aesar, powder) | 100° C. | THF or NMP or DMF | FIG. 1 | Li | Yellow-Brown |
| $V_2O_5$ (Aldrich, powder) | 100° C. | THF or NMP or DMF | FIG. 1 | Li | Yellow |
| $Bi_2Se_3$ (powder, Sigma-Aldrich) | 100° C. | THF or NMP or DMF | FIG. 1 | Li | Yellow |
| $In_2Se_3$ (powder, Sigma-Aldrich) | 100° C. | THF or NMP or DMF | FIG. 1 | Li | Yellow-Brown |
| Black Phosphorous (rough powder/crystals, Smart-elements GmbH) | 100° C. | THF or NMP or DMF | FIG. 1 | Na, K | Orange-Yellow |
| $WSe_2$ (powder, VWR International) | 150° C. | THF or NMP or DMF | FIG. 1 | Li | Pale yellow |
| $MoSe_2$ (powder, Sigma-Aldrich) | 150° C. | THF or NMP or DMF | FIG. 1 | Li | Yellow |
| $Sb_2Te_3$ (powder, Sigma-Aldrich) | 100° C. | THF or NMP or DMF | FIG. 1 | Li | Dark brown/purple |
| GaTe (VWR) chunks | 100° C. | THF or NMP or DMF | FIG. 1 | Li, K | Pink |

Figure 4:
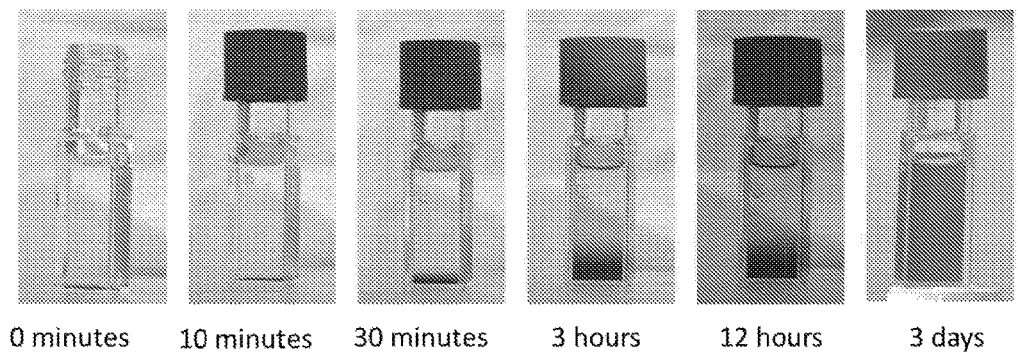
FIG. 4 is a series of photographs showing the spontaneous dissolution of $Bi_2Te_3$ in DMF over a period of 3 days.
Figure 5:
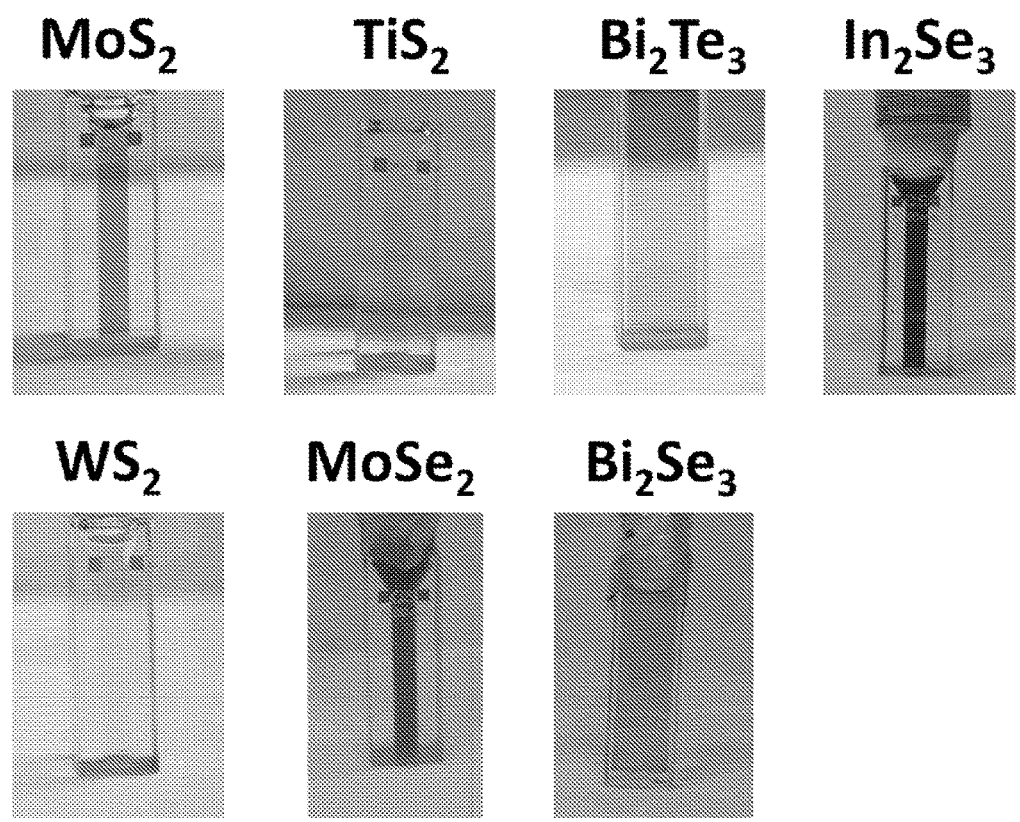
FIG. 5 is a series of photographs of spontaneously dissolved solutions of made from seven layered materials.
Figure 6:
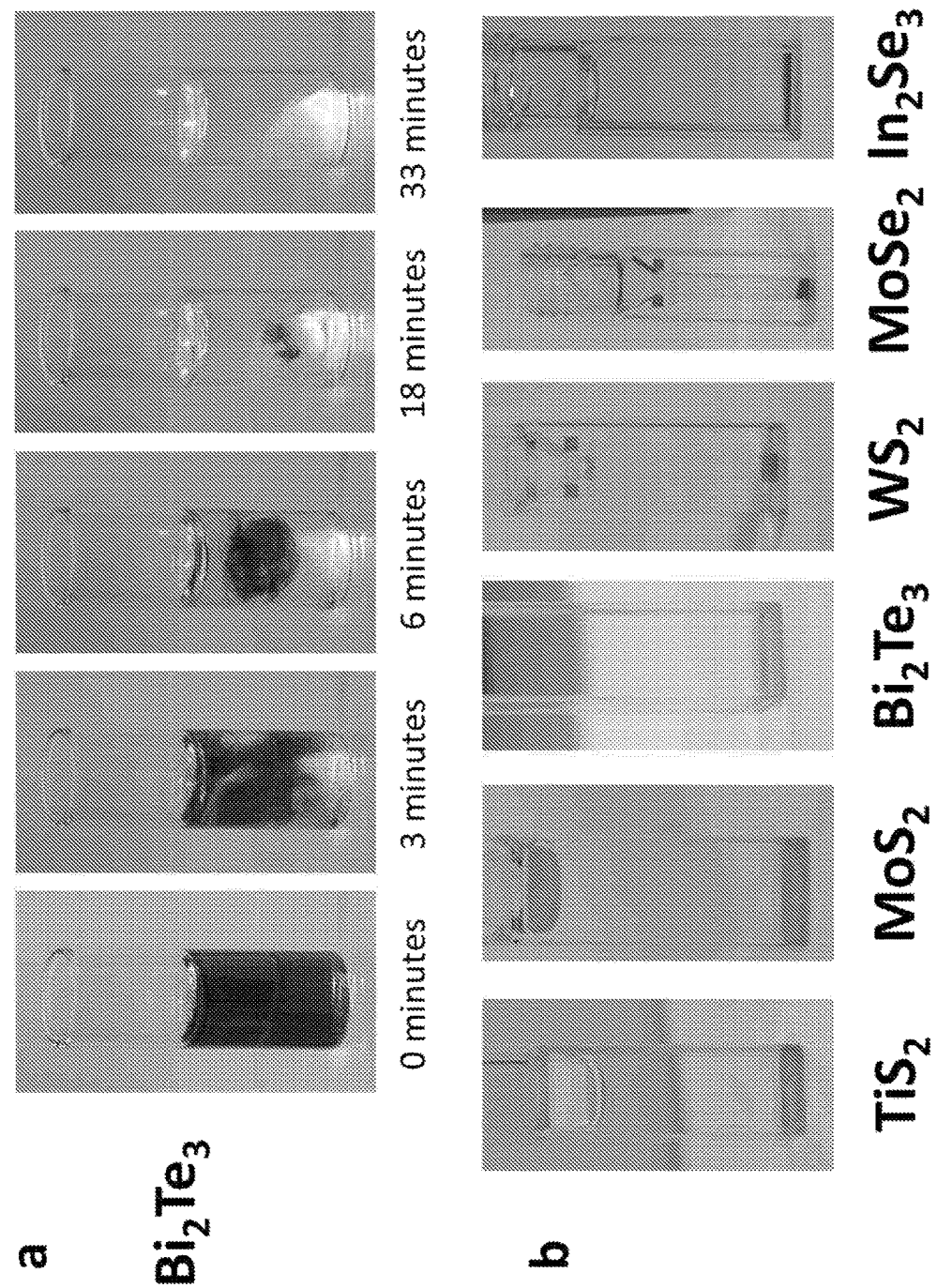
FIG. 6 is a) a timelapse series of photographs showing $Bi_2Te_3$ dissolved in DMF crashing following exposure to air and b) solutions of six layered materials shown in FIG. 5 following exposure to air.
Figure 7A:
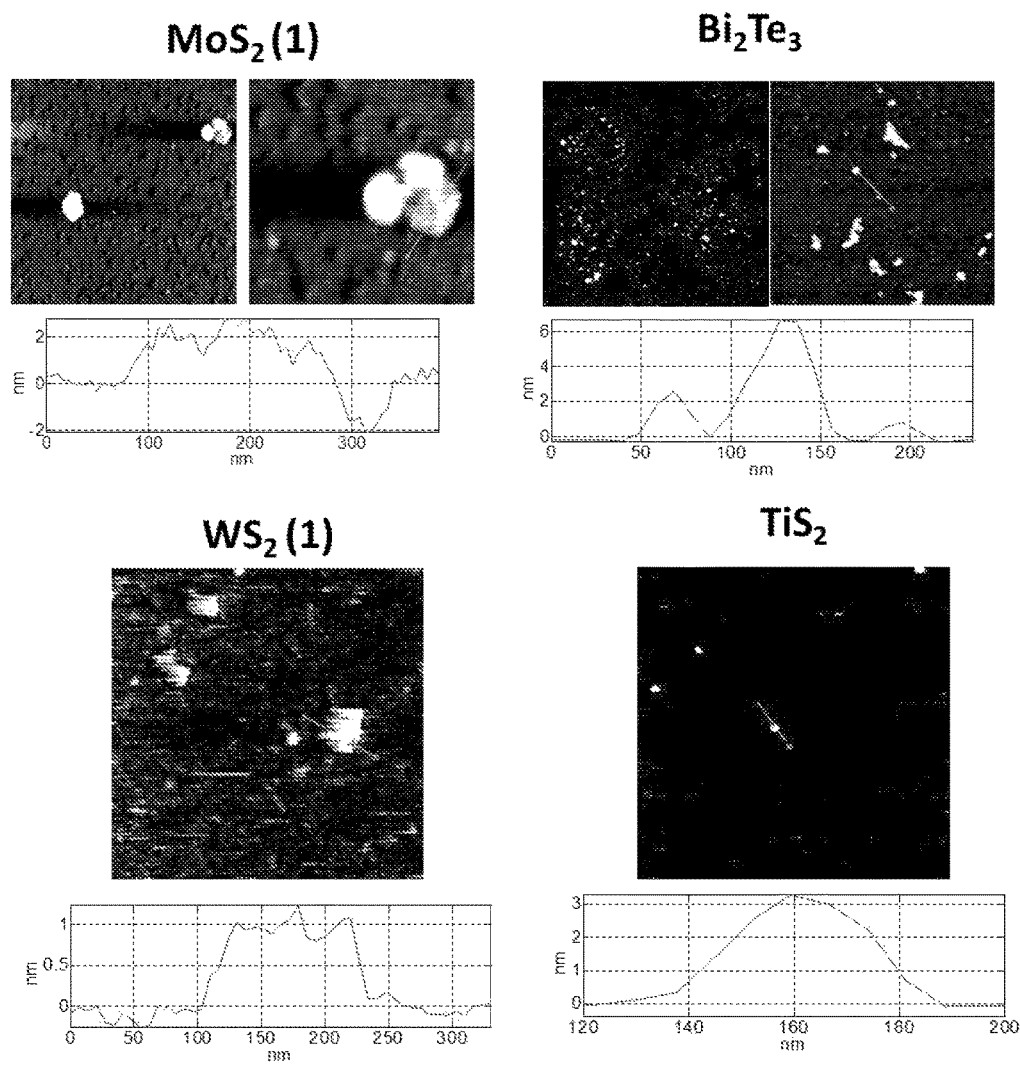
Figure 7B:
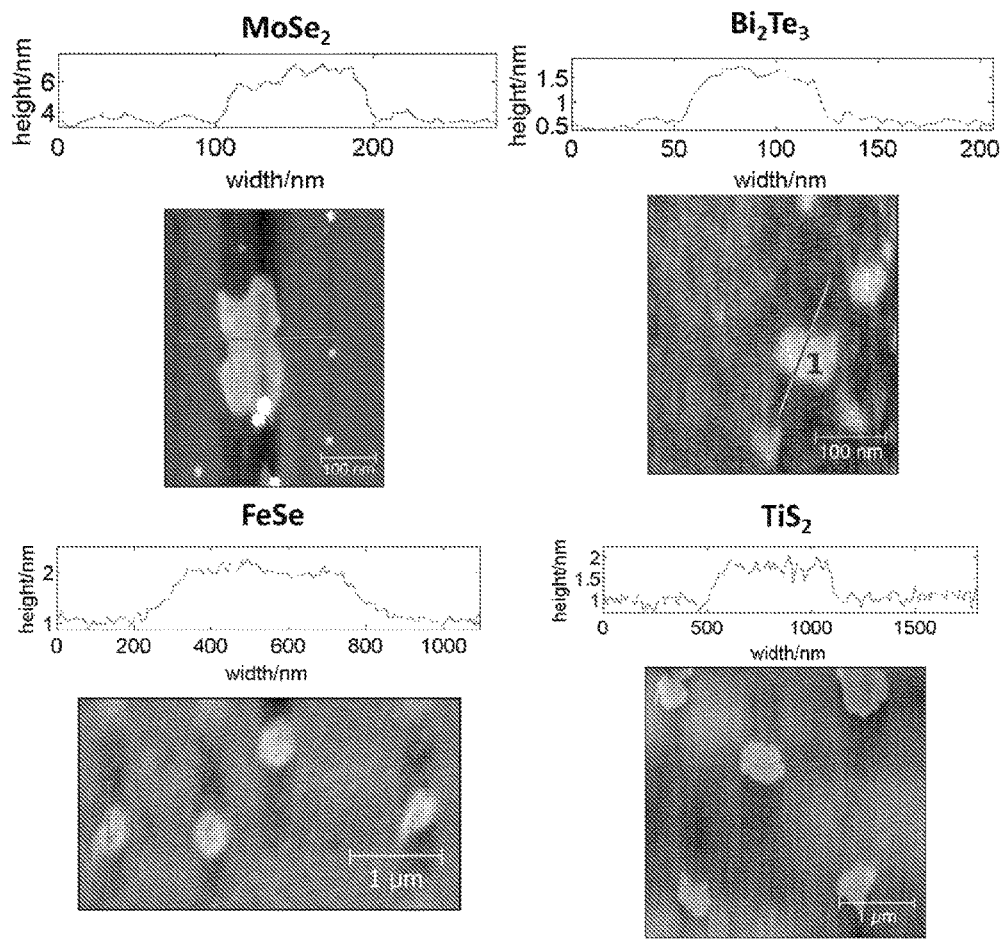
Figure 7C:
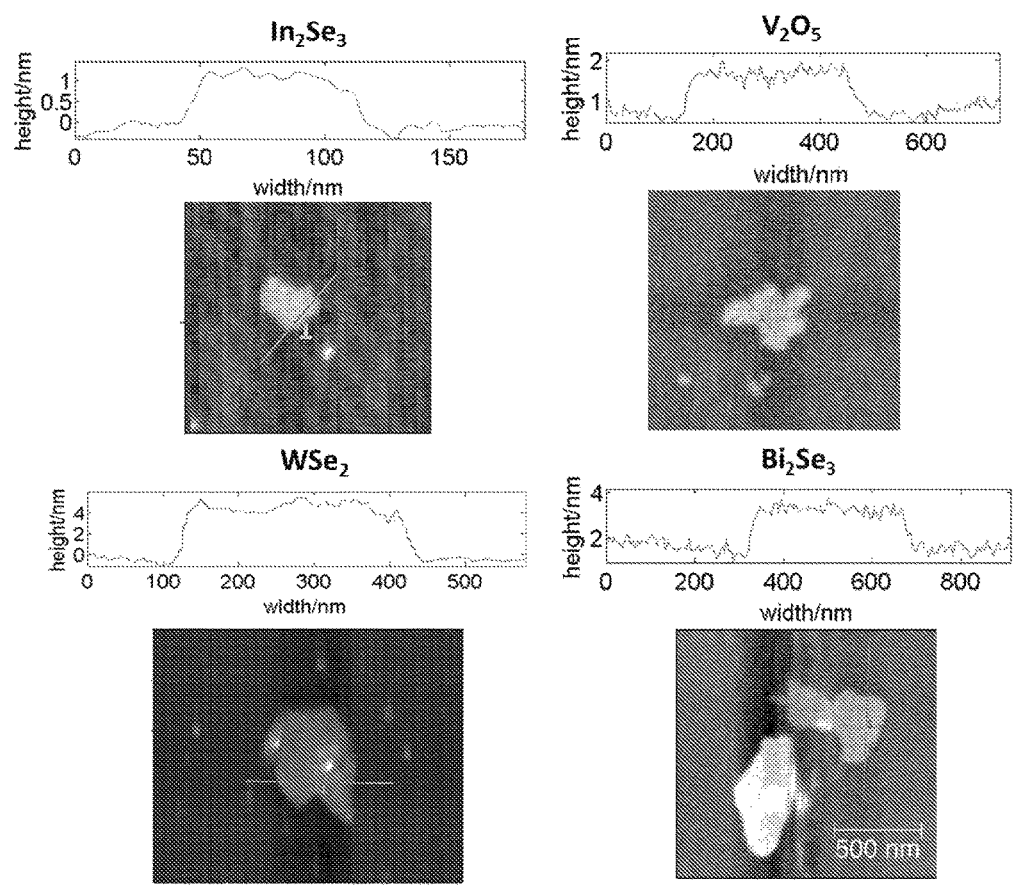
Figure 7D:
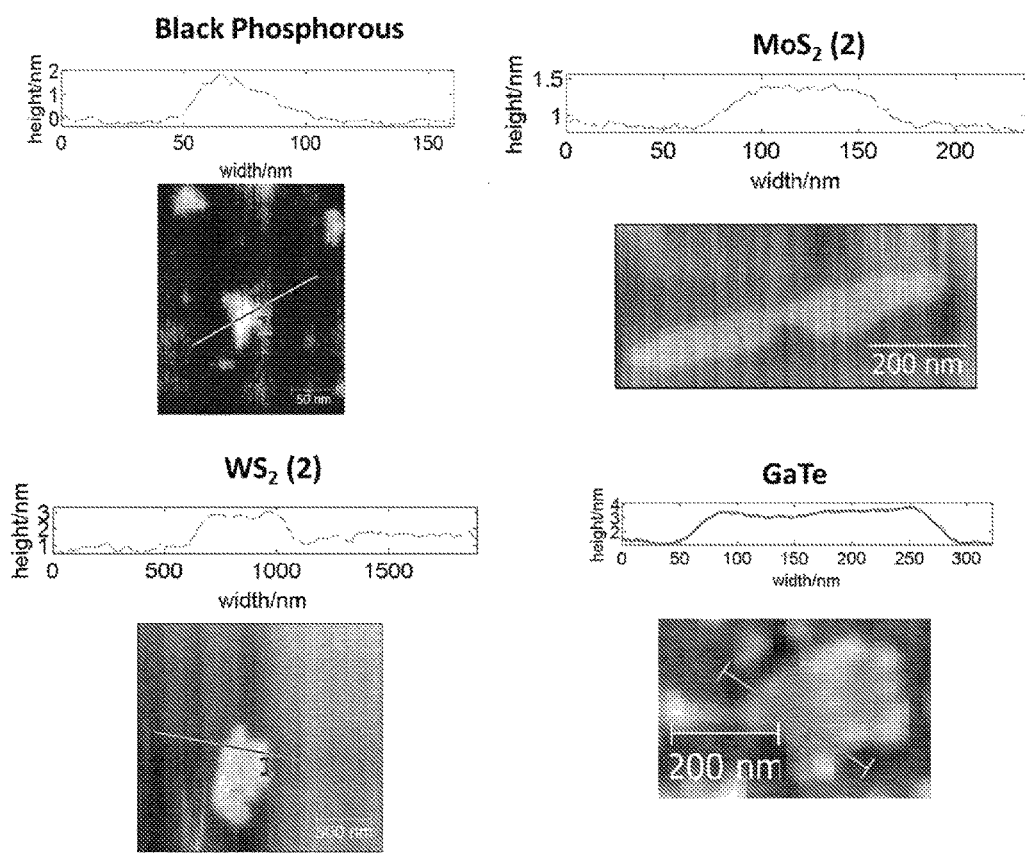
Figure 8A:
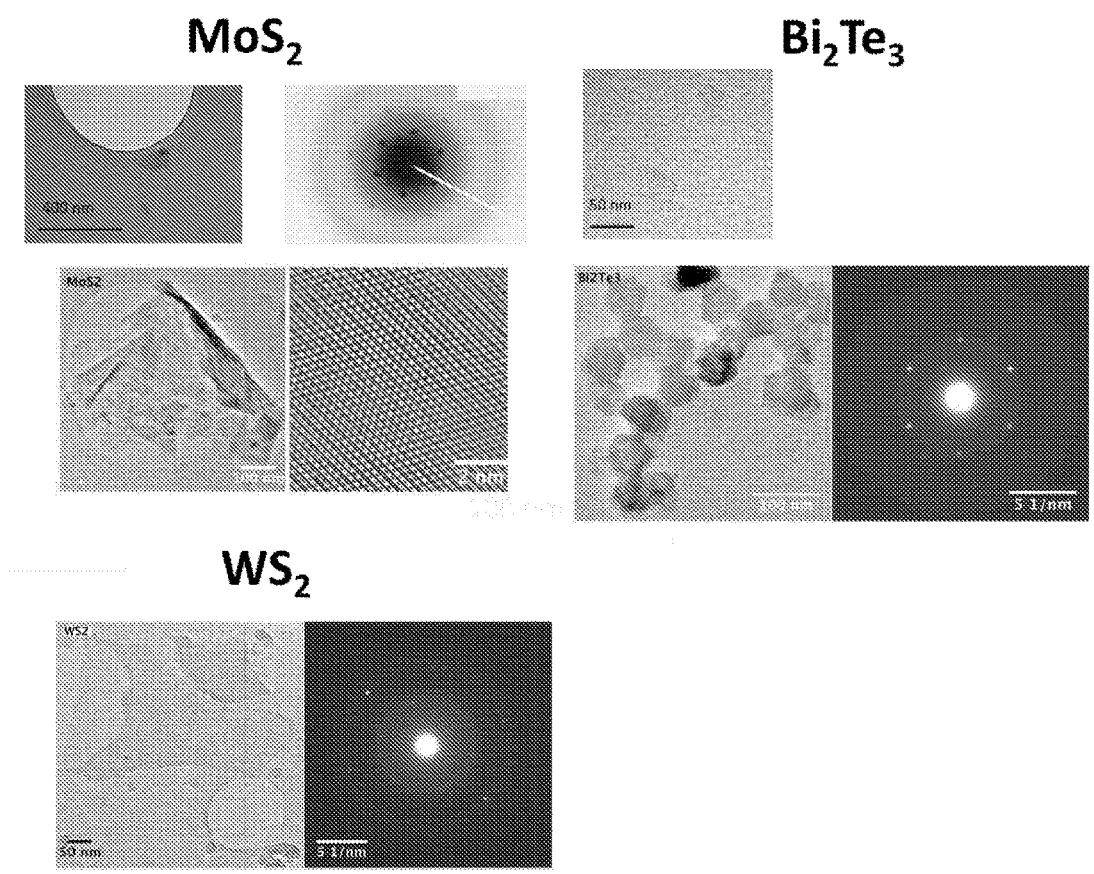
Figure 8B:
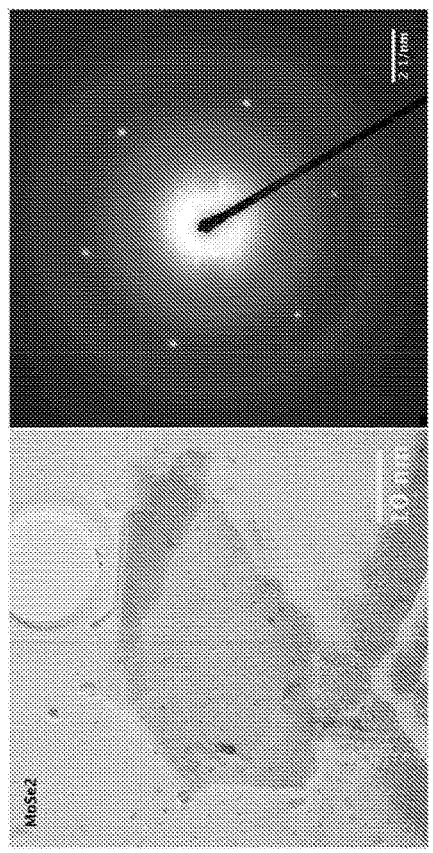
Figure 8B:
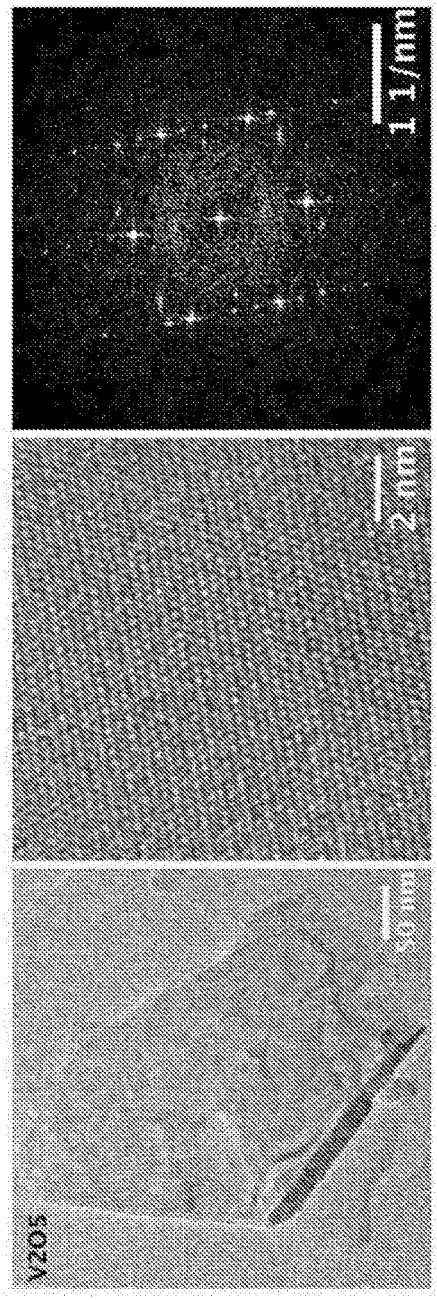
Figure 8C:
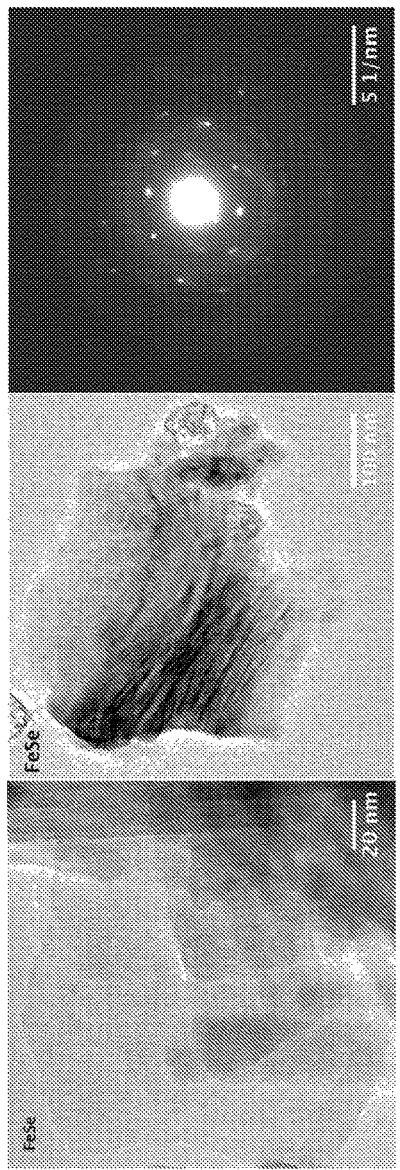
Figure 8C:
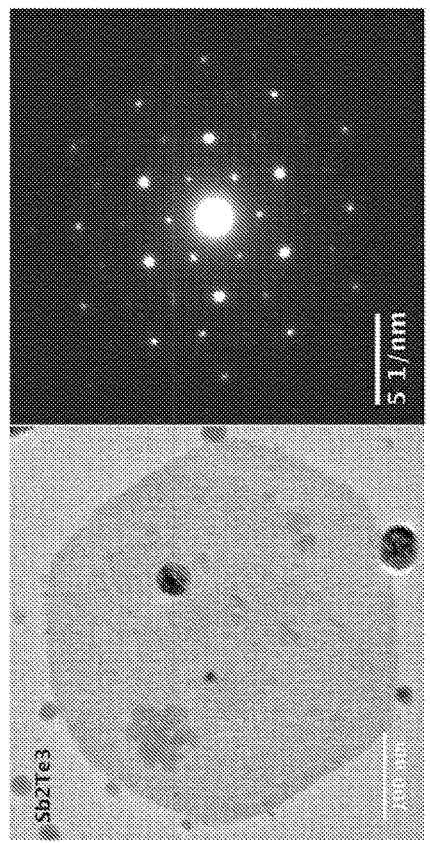

The presence of dissolved species in solution was evident by the change in colour of the solutions; in all cases the solvent was originally colourless. A time sequence demonstrating the spontaneous dissolution in a quartz cell is shown in FIG. 4. The example solutions are all coloured and examples are shown in FIG. 5 and the colour of the solutions is detailed in Table 1. These solutions are stable if kept in a stringently air and moisture free environment (several of the solutions have been observed to be stable over a period of over one year at the time of writing). If a hand-held laser is shined through any of the nanosheet solutions (shown in FIG. 4 for $In_2Se_3$ and $Bi_2Se_3$), the laser is visibly scattered via the Tyndall effect, confirming the presence of dissolved nanoparticles. The requirement of these conditions is demonstrated by exposing the solutions to air after which the dissolved species 'crash out', as shown in FIG. 6. This is consistent with the solutions containing negatively charged nanosheets. Specifically, upon exposure to air the charge on the nanosheets is quenched by the oxygen in the air, thus the interaction of the nanosheets with the polar aprotic solvent, that resulted in their dissolution being thermodynamically favourable while the nanosheets were charged, no longer exists, and the solutions are no longer stable.

Atomic force microscopy (AFM) was performed on all nanosheets deposited from the solutions onto mica substrates. The linescans from the AFM clearly demonstrate the expected plate-like structure of the nanosheets with heights of order of ~nm and lateral dimensions over an order of magnitude greater (see FIG. 7). For the majority of cases flakes of ~1 nm height are visible, indicating individual monolayer nanosheets/platelets. For $MoS_2$, the hexagonal form arising from the underlying symmetry of the nanosheet crystals is clearly visible; this indicates that the nanosheets are undamaged as this is the shape of the crystallites in pristine bulk samples of the parent layered material.

Transmission Electron Microscopy (TEM) is a powerful technique which can image the nanosheets to ~nm scale resolution and also permits an electron diffraction pattern on the nanofocused image from which the crystallographic structure of the material can be determined. The presence of nanosheets in solution was confirmed by the TEM micrographs (FIG. 8). As also shown with AFM for $MoS_2$ and very clearly for $Bi_2Te_3$ and $Sb_2Te_3$, the hexagonal form of the nanosheet crystals in bulk form can be maintained confirming the process can yield solutions of undamaged nanosheets. Furthermore, the diffraction pattern taken from an entire nanosheet of $MoS_2$ shows the presence of the single-crystal of hexagonal symmetry expected from a pristine $MoS_2$ crystal. Analysis of the diffraction pattern yields the hexagonal lattice unit vector 3.17+/−0.2 Å, identical to that of bulk $MoS_2$ as measured by high resolution diffraction of 3.16 Å [xxi]. As well as confirming the nanosheet is indeed $MoS_2$ and that the crystal structure of the bulk materials is maintained in the nanosheet form, the fact that there is a single set of spots indicates that this nanosheet is unfolded. It is also important to note that this diffraction pattern shows only diffraction spots expected from a pristine 2H-$MoS_2$ crystal, the principal polymorph found in bulk $MoS_2$. This is relevant because $MoS_2$ which is exfoliated via intercalation followed by reaction with water yields nanosheets with a significant number of the (distorted) polymorph 1T-$MoS_2$ [viii]. For 1T-$MoS_2$, the distortion leads to an extra set of superlattice spots in the electron diffraction pattern [xxii]. The lack of these spots in the diffraction pattern in FIG. 8 confirms the presence of undistorted undamaged $MoS_2$ nanosheet. Electron diffraction also confirms the crystal structure of the bulk layered material is maintained in the nanosheets deposited from solution in at least the cases of $Bi_2Te_3$, $WS_2$, $MoSe_2$, $Sb_2Te_3$ and $V_2O_5$. High resolution TEM was taken for $MoS_2$ and $V_2O_5$ (FIG. 8) revealing the expected (defect free) atomic lattice, indicating pristine nanosheets.

Plated Material

Figure 9A:
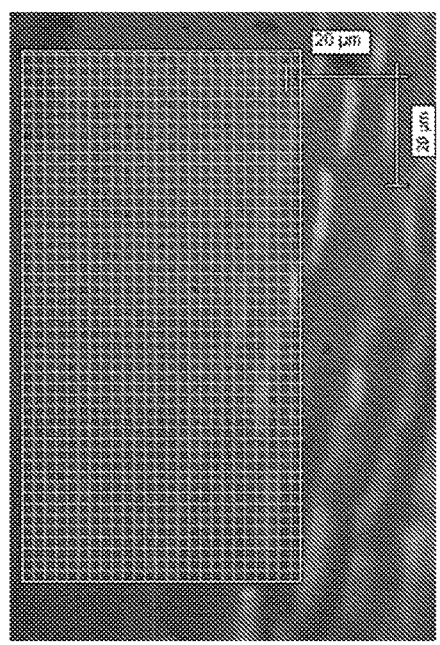
Figure 9A:
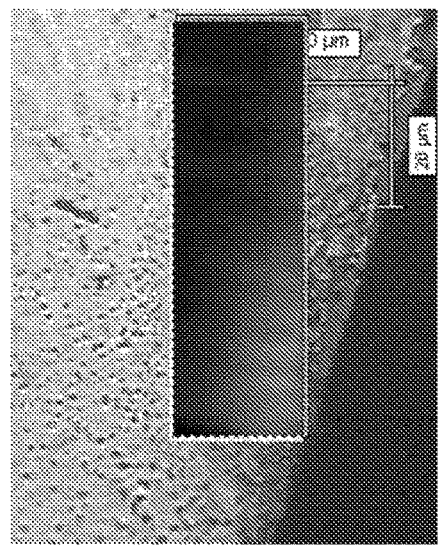
Figure 9A:
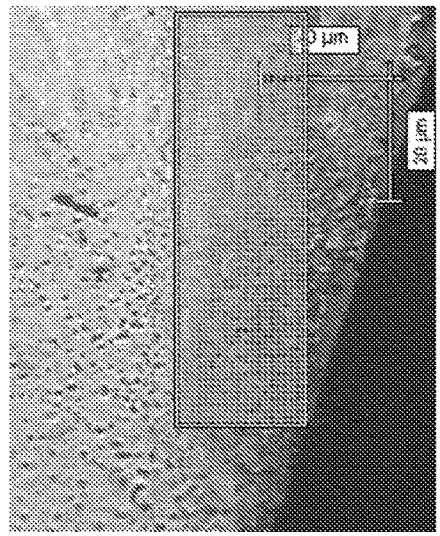
Figure 9A:
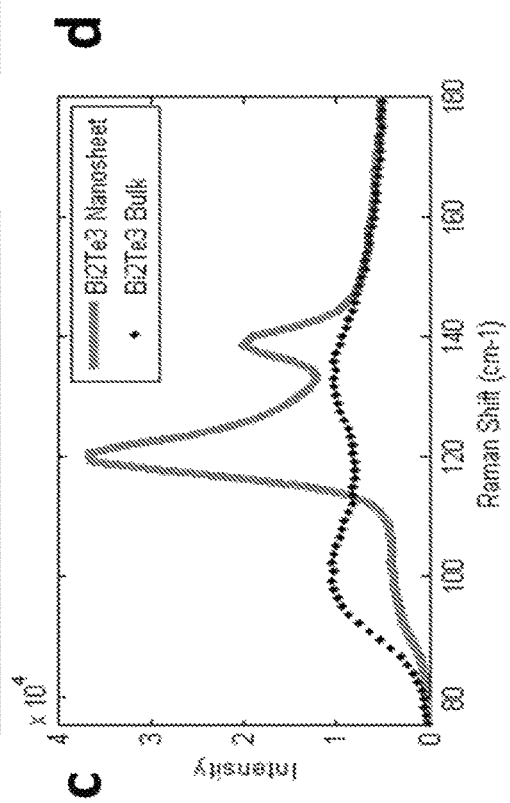
Figure 9B:
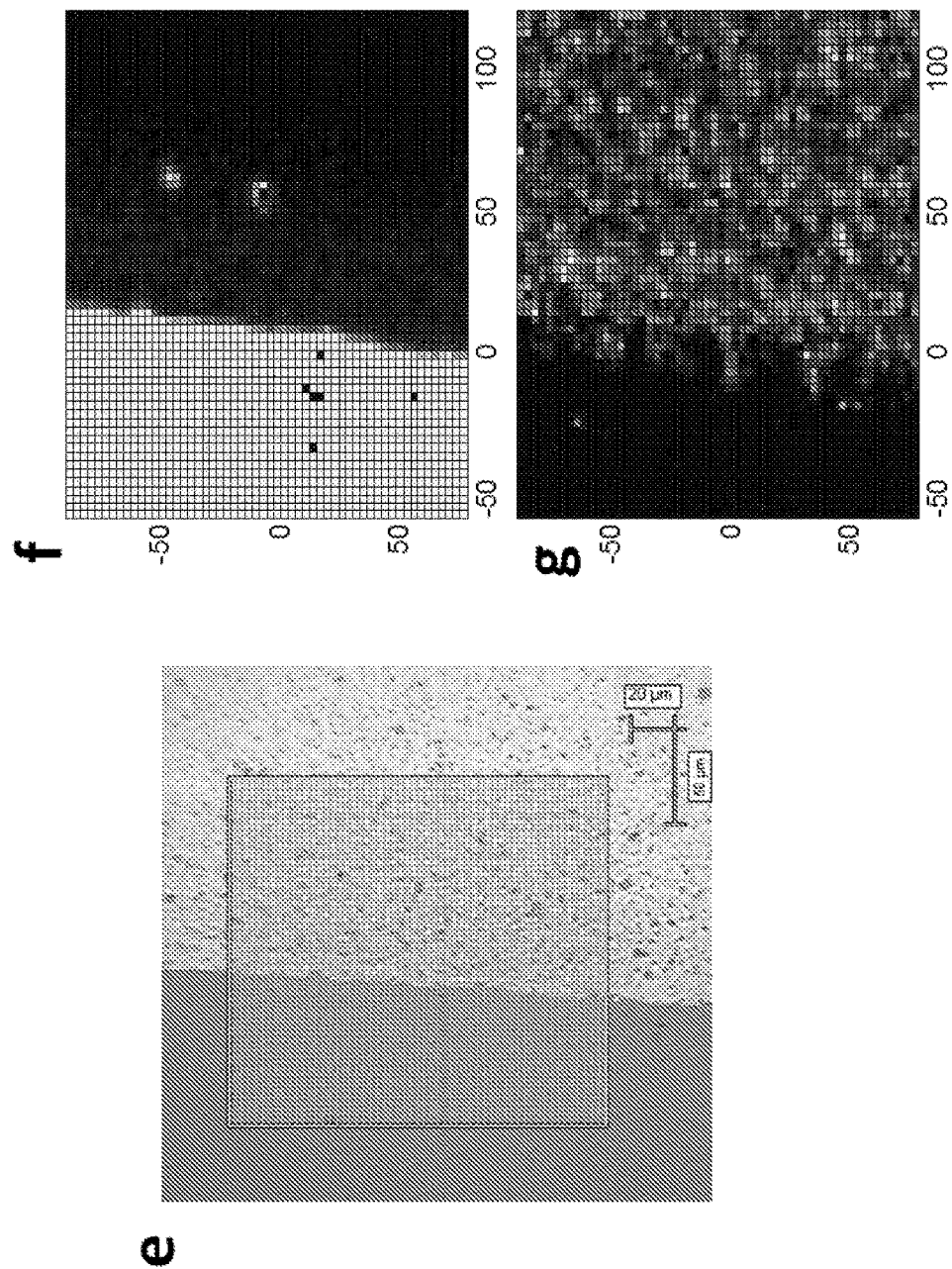

To quench the charge electrochemically, an electric field of ~1 $Vcm^{-1}$ was applied across two platinum coated silicon electrodes, to a solution of spontaneously dissolved nanosheets, for 12 hours. Following this, the electrodes were removed from the solution, gently rinsed in pure solvent and dried under vacuum at ~100° C. FIG. 9 shows optical micrographs of the part of the electrodes immersed in solution following plating for a solution of $Bi_2Te_3$ nanosheets in DMF. The positive electrode (FIG. 9a) is coated in material whereas the negative electrode (FIG. 9b) is apparently clear. The Raman spectra taken from the positive electrode is shown in FIG. 9c alongside that for bulk $Bi_2Te_3$. For this material there is a significant difference between the Raman spectra for the bulk material to that of nanosheets. This is due to symmetry breaking as the $Bi_2Te_3$ is reduced to ultrathin sizes, as measured in mechanically exfoliated and chemical grown nanosheets [xxiii, xxiv]. In fact, the data shown in FIG. 9c for the material plated on the positive electrode shows very close agreement with literature values for the uncharged $Bi_2Te_3$ nanosheets. The presence of $Bi_2Te_3$ nanosheets in solution as negatively charged species, as they are deposited on the positive electrode, is therefore confirmed. Raman scattering is probe of the vibronic spectrum of a material which is determined from the material's intrinsic crystal structure. Measuring the expected Raman spectra for $Bi_2Te_3$ nanosheets confirms that crystal structure of the material is maintained and also that there is no significant functionalisation of the nanosheets themselves, which would damage the crystal structure. A Raman map scan was then performed near the edge of the electrode towards where the local electric field is stronger and the resulting, deposited film therefore thicker. It was found that accompanying increase in the film's visible increase in thickness is a monotonic increase in intensity of the nanosheet spectra as demonstrated by the intensity colour map of the $Bi_2Te_3$ nanosheet peak at ~120 $cm^{-1}$ in FIG. 9d. Despite this increase in thickness there is no accompanying recovery of spectra for bulk $Bi_2Te_3$. This indicates the deposited material comprises restacked undamaged crystals of nanosheets rather than a reforming of the original bulk $Bi_2Te_3$ crystal. A map of >700 measurement positions (as shown by the grid on FIG. 9b) on the negative electrode over the same region showed no measurable signal. A similar process was carried out for a solution of charged $MoSe_2$ nanosheets in DMF. In this case, the electrodes were such that the conductive platinum coating did not completely cover the underlaying silicon/$SiO_2$ substrate, leaving an insulating region. Following the electroplating (in this case at 3 $Vcm^{-1}$ for 48 hours), a Raman map scan, using a 514.5 nm laser, was taken over the points on the grid shown in the optical micrograph FIG. 9e. This figure also clearly shows two distinct regions which coninicide with where the substrate was bare (left hand side) and where it was coated with platinum (right hand side). Individual Raman spectra taken from the left hand side show the dominant silicon peak at ~520 $cm^{-1}$ and no peak at ~241 $cm^{-1}$ which would be expected to arise from deposited $MoSe_2$ nanosheets [xxv]. In contrast, the spectra taken from the right side of the grid show sharp peaks at 241 $cm^{-1}$ confirming the presence of $MoSe_2$. FIGS. 9f and 9g show the Raman intensity maps for the silicon peak and $MoSe_2$ peak respectively, and confirm the MoSe$_2$ is plated with precision only upon where the substrate is coated with platinum.

Measurement Techniques

X-ray diffraction was undertaken on an X-pert Philips diffractometer in reflection geometry with a Cu source ($\lambda$=1.54 Å).

AFM was undertaken on a Bruker Dimension 3100 or custom built High Speed AFM (HSAFM). The nanosheets were dropped from solution onto precleaved mica substrates; the solvent was removed by dynamic vacuum. Scans were performed in intermittent-contact mode with PPP-NCH silicon cantilevers (Nanosensors, Neuchâtel Switzerland). HSAFM was undertaken using a Laser Doppler Vibrometer (Polytec VIB-A-510) to directly measure height using a (Bruker MSNL) silicon tip on Nitride lever in contact mode. Imaging was typically performed using a 4 um$^2$ window, imaging at 2 fps.

TEM was undertaken on a JEOL 1010 system at 80 keV or JEOL 2100 operated at 200 keV and images captured with a Gatan Orius SC200W. In the case of the images that include high resolution TEM, the imaging was performed with an FEI Titan operated at 300 kV. The electron diffraction was taken on a JEOL 100 keV system as well as the JEOL 2100 and the Titan. The nanosheets were dropped from solution onto Holey Carbon Films on 300 Mesh Copper Grids.

Raman experiments were performed using a Renishaw inVia micro-Raman spectrometer using either a 785 nm, or a 514.5 nm or a 488 nm laser. The laser was focused to ~3 µm and the power at the sample was kept below 2 mW. Raman mapping was performed using an automatic stage permitting spectra to be taken at individual points on a grid. Raman spectroscopy measures the Raman active phonons close to the Brillouin zone centre, which depend on its crystal structure, and can therefore give a finger print of a particular material. Furthermore, Raman spectra can be sensitive to number of layers in a layered material for example, in Bi$_2$Te$_3$ [xxiii,xxiv] Small angle scattering is a powerful technique for probing the structure of nanosheets in solution.

More specifically, small angle scattering can be used to determine whether the nanosheets are present as isolated species or in agglomerated form. Small angle scattering can provide information on the structure of large particles in solution. Specifically, it can provide unique information about the shape of dissolved particles and their concentration in solution. The small angle scattering intensity, I, is usually measured as a function of the momentum transfer Q. At intermediate Q-values, I(Q) is proportional to Q$^{-D}$, where D is the fractal dimension of the dissolved particles/nanosheets. Thus, the expected small angle scattering pattern for fully dispersed plate-like objects (i.e. D~2) such as nanosheets is Q$^{-2}$ behaviour. Dispersions of otherwise, non-mono-dispersions of nanosheets, i.e. those consisting of agglomerates or scrolled or folded nanosheets will, on the other hand, exhibit larger fractal dimensions, typically from 3 to 5.

The small angle scattering technique is very sensitive to the presence of larger particles and hence if agglomerates are present in the solution under test then the small angle scattering signal will be dominated by these agglomerates.

Photoluminescence (PL) describes the process of light emission, after the absorption of photons. In a direct band gap semiconductor, photoluminescence (PL) can be used to determine the band gap energy when the energy of the incident photons is bigger than the band gap itself. For example for MoS$_2$ the monolayer form of the 2H-MoS$_2$ polymorph which is a direct bandgap semiconductor exhibits PL whereas bulk MoS$_2$ or the monolayer 1T-MoS$_2$ polymorph does not.

Scanning electron microscopy (SEM) produces images of a sample by scanning it with a focused beam of electrons and can yield information on the samples morphology to a resolution of ~10 nm.

REFERENCES

[i] Electric Field Effect in Atomically Thin Carbon Films, *Science* (2004) Vol. 306, 666-669

[ii] Electronics and optoelectronics of two-dimensional transition metal dichalcogenides *Nature Nanotechnology* (2012) 7, 699-712 http://www.nature.com/nnano/journal/v7/n11/full/nnano.2012.193.html

[iii] Two-Dimensional Nanosheets Produced by Liquid Exfoliation of Layered Materials *Science* (2011) 331, 568-571 http://www.sciencemag.org/content/331/6017/568.full

[iv] Liquid Exfoliation of Layered Materials *Science* (2013): 340, 6139 http://www.sciencemag.org/content/340/6139/1226419.full

[v] Experimental observation of the quantum Hall effect and Berry's phase in graphene, *Nature*, (2005), 438, 201-204 http://www.nature.com/nature/journal/v438/n7065/abs/nature04235.html

[vi] Superconducting Dome in a Gate-Tuned Band Insulator *Science* (2012), 338, 1193-1196 DOI: 10.1126/science.1228006

[vii] SINGLE CRYSTALS OF TRANSITION METAL TRICHALCOGENIDES *Journal of Crystal Growth* (1983) 61, 61-68

[viii] Phosphorene: A New 2D Material with High Carrier Mobility, arXiv:1401.4133 http://arxiv.org/abs/1401.4133

[ix] Vapour phase growth and grain boundary structure of molybdenum disulphide atomic layers *Nature Materials*, (2013) 12, 754-759 doi:10.1038/nmat3673

[x] Electronic transport and device prospects of monolayer molybdenum disulphide grown by chemical vapour deposition *Nature Communications* 5, Article number: 3087 doi:10.1038/ncomms4087

[xi] High-yield production of graphene by liquid-phase exfoliation of graphite *Nature Nano.*, (2008), 3, 563-568 http://www.nature.com/nnano/journal/v3/n9/abs/nnano.2008.215.html

[xii] Morrison et al. Forms of Transition Metal Dichalcogenides U.S. Pat. No. 4,822,590, Filed Apr. 23 1986

[xiii] Single-layer MoS$_2$ *Materials Research Bulletin* (1986) 21(4), 457-461 http://www.sciencedirect.com/science/article/pii/0025540886900115

[xiv] Photoluminescence from Chemically Exfoliated MoS$_2$ *Nano Lett.*, (2011), 11 (12), 5111-5116 http://pubs.acs.org/doi/abs/10.1021/nl201874w

[xv] High yield exfoliation of two-dimensional chalcogenides using sodium naphthalenide *Nature Communications* 5, Article number:2995 http://www.nature.com/ncomms/2014/140102/ncomms3995/full/ncomms3995.html

[xvi] Lithium intercalation and exfoliation of layered bismuth selenide and bismuth telluride *J. Mater. Chem.*, (2009), 19, 2588-2592 http://pubs.rsc.org/en/content/articlepdf/2009/jm/b820226e

[xvii] Single-Layer Semiconducting Nanosheets: High-Yield Preparation and Device Fabrication *Angewandte Chemie International Edition*, (2011) 50(47), 11093-11097 http://onlinelibrary.wiley.com/doi/10.1002/anie.201106004/abstract

[xviii] Sheets of Transition Metal Dichalcogenides, U.S. Pat. No. 4,996,108A Filed Jan. 17, 1989.

[xix] Alkali metal intercalates of molybdenum disulfide, *J. Chem. Phys.* (1973), 58, 697 http://dx.doi.org/10.1063/1.1679256

[xx] Physics and chemistry of $MoS_2$ intercalation compounds *Materials Science and Engineering* (1977), 31, 289-295 http://www.sciencedirect.com/science/article/pii/S0010854501003927

[xxi] Effect of Pressure and Temperature on Structural Stability of $MoS_2$, J. Phys. Chem. C. (2014) Article ASAP 10.1021/jp410167k

[xxii] Electron Diffraction Study of Intercalation Compounds Derived from 1T-$MoS_2$, *J. Solid State Chemistry*, (1999) 144, 430. http://dx.doi.org/10.1006/jssc.1999.8193

[xxiii] One-Step Synthesis of Bismuth Telluride Nanosheets of a Few Quintuple Layers in Thickness *Angew. Chem. Int. Ed.* (2011), 50, 10397

[xxiv] Crystal symmetry breaking in few-quintuple Bi2Te3 films: Applications in nanometrology of topological insulators *Appl. Phys. Lett.* (2010), 96, 153103 DOI: 10.1063/1.339190

[xxv] Photoluminesence emission and Raman response of monolayer $MoS_2$, $MoSe_2$ and $WS_2$, *Optics express* (2013), 21(4), 4908. DOI: http://dx.doi.org/10.1364/OE.21.004908

The invention claimed is:

1. A method for producing a thermodynamically stable solution of nanosheets, comprising the step of contacting an intercalated layered material with a polar aprotic solvent to produce a solution of nanosheets, wherein the intercalated layered material is prepared from a layered material selected from the group consisting of a transition metal dichalcogenide, a transition metal monochalcogenide, a transition metal trichalcogenide, a transition metal oxide, a metal halide, an oxychalcogenide, an oxypnictide, an oxyhalide of a transition metal, a trioxide, a perovskite, a niobate, a ruthenate, a layered III-VI semiconductor, black phosphorous and a V-VI layered compound.

2. The method according to claim 1, wherein the layered material is selected from the group consisting of a transition metal dichalcogenide, a transition metal monochalcogenide, a transition metal trichalcogenide, a transition metal oxide, a layered III-VI semiconductor, black phosphorous and a V-VI layered compound.

3. The method according to claim 2, wherein the layered material is selected from the group consisting of a transition metal dichalcogenide, a transition metal monochalcogenide, a transition metal oxide, a layered III-VI semiconductor, black phosphorous and a V-VI layered compound.

4. The method according to claim 1, wherein the V-VI layered compound is selected from the group consisting of $Bi_2Te_3$ and $Bi_2Se_3$.

5. The method according to claim 1, wherein the layered material is selected from the group consisting of $MoS_2$, $WS_2$, $TiS_2$, $NbSe_2$, $NbTe_2$, $TaS_2$, $MoSe_2$, $MoTe_2$, $WSe_2$, $Bi_2Te_3$, $Bi_2Se_3$, FeSe, GaS, GaSe, GaTe, $In_2Se_3$, $TaSe_2$, $SnS_2$, $SnSe_2$, $PbSnS_2$, $NiTe_3$, $SrRuO_4$, $V_2O_5$, $ZrSe_2$, $ZrS_3$, $HfTe_2$, $Sb_2Te_3$ and black phosphorous.

6. The method according to claim 1, wherein the layered material is selected from the group consisting of $MoS_2$, $WS_2$, $TiS_2$, $Bi_2Te_3$, FeSe, $V_2O_5$, $Bi_2Se_3$, $In_2Se_3$, $WSe_2$, $MoSe_2$, GaTe, $Sb_2Te_3$ and black phosphorous.

7. The method according to claim 1, wherein the polar aprotic solvent is selected from the group consisting of tetrahydrofuran, dimethyl sulfoxide, ethers, amides, N-methyl pyrrolidone, acetonitrile, $CS_2$, N-cyclohexyl-2-pyrrolidone, dimethyl sulfoxide, ammonia, methylamine solvents and mixtures thereof.

8. The method according to claim 1, wherein the method further comprises the step of preparing the intercalated layered material by contacting a layered material with an electronic liquid to form an intercalated layered material.

9. The method according to claim 8, wherein the electronic liquid comprises a metal and a solvent.

10. The method according to claim 9, wherein the solvent is an amine solvent.

11. The method according to claim 9, wherein the metal is selected from the group consisting of alkali metals and alkaline earth metals.

12. The method according to claim 1, wherein the nanosheets are unfunctionalised.

13. The method according to claim 1, wherein the nanosheets comprise four or less stacked monolayers.

14. The method according to claim 1, wherein the nanosheets have the in-plane crystal structure of the layered material from which they are derived.

15. The method according to claim 1, wherein the nanosheets substantially have the in-plane dimensions of the layers of the layered material from which they are derived.

16. The method according to claim 1, wherein the nanosheets are undistorted.

17. The method according to claim 1, wherein the nanosheets are unfolded.

18. The method according to claim 1, wherein the intercalated layered material spontaneously dissolves in the polar aprotic solvent to produce the solution of nanosheets.

19. The method according to claim 1, wherein the method further comprises the step of quenching the nanosheets to form a plated material.

20. The method of claim 19, wherein the quenching step comprises electrochemically quenching the nanosheets.

21. The method of claim 19, wherein the quenching step comprises chemically quenching the nanosheets.

22. The method according to claim 19, wherein the plated material has the in-plane crystal structure of the layered material from which it is derived.

23. The method of claim 1, wherein the method further comprises the step of functionalising the nanosheets by contacting the nanosheets with RX, wherein R is a hydrocarbon group and X is a suitable leaving group.

24. The method of claim 1, wherein the method further comprises the step of removing the solvent by freeze drying to produce an aerogel of the nanosheets.

* * * * *